US00RE42695E

(19) United States
(12) Reissued Patent
Singleton

(10) Patent Number: US RE42,695 E
(45) Date of Reissued Patent: Sep. 13, 2011

(54) REINFORCED SILT RETENTION SHEET

(75) Inventor: Earl R. Singleton, Oxford, GA (US)

(73) Assignee: Silt-Saver, Inc., Conyers, GA (US)

(21) Appl. No.: 12/483,633

(22) Filed: Jun. 12, 2009

Related U.S. Patent Documents

Reissue of:
(64) Patent No.: 7,465,129
Issued: Dec. 16, 2008
Appl. No.: 11/283,173
Filed: Nov. 18, 2005

U.S. Applications:
(63) Continuation-in-part of application No. 10/647,758, filed on Aug. 25, 2003, now abandoned.

(60) Provisional application No. 60/406,176, filed on Aug. 27, 2002.

(51) Int. Cl.
*E02D 17/20* (2006.01)
*E01F 7/02* (2006.01)

(52) U.S. Cl. ..... 405/302.7; 428/221; 442/401; 256/12.5

(58) Field of Classification Search ..... 405/52, 405/74, 302.6, 302.7; 442/381, 382, 392, 442/401, 14, 36; 256/1, 12.5, 13; 428/221
See application file for complete search history.

(56) References Cited

U.S. PATENT DOCUMENTS

| | | | | |
|---|---|---|---|---|
| 1,964,419 | A | | 6/1934 | Asten |
| 3,252,484 | A | | 5/1966 | Meyer et al. |
| 3,283,788 | A | | 11/1966 | Bottomley et al. |
| 3,699,686 | A | * | 10/1972 | De Winter ..... 405/19 |
| 4,279,535 | A | | 7/1981 | Gagliardi et al. |
| 4,302,495 | A | * | 11/1981 | Marra ..... 428/110 |
| 4,606,964 | A | * | 8/1986 | Wideman ..... 428/152 |
| 4,734,311 | A | * | 3/1988 | Sokolowski ..... 428/152 |
| 4,756,511 | A | | 7/1988 | Wright, III |
| 5,048,228 | A | * | 9/1991 | Neveu et al. ..... 47/9 |
| 5,108,224 | A | * | 4/1992 | Cabaniss et al. ..... 256/12.5 |
| 5,201,497 | A | | 4/1993 | Williams et al. |
| 5,380,582 | A | * | 1/1995 | Neely et al. ..... 428/220 |
| 5,431,991 | A | * | 7/1995 | Quantrille et al. ..... 428/109 |
| 5,585,161 | A | * | 12/1996 | Difloe et al. ..... 428/109 |
| 5,735,640 | A | | 4/1998 | Meyer et al. |
| 5,758,868 | A | * | 6/1998 | Shea ..... 256/12.5 |
| 5,843,306 | A | | 12/1998 | Singleton |
| 5,877,096 | A | * | 3/1999 | Stevenson et al. ..... 442/36 |
| 5,928,752 | A | * | 7/1999 | Newquist ..... 428/74 |
| 5,954,451 | A | * | 9/1999 | Presby ..... 405/49 |
| 6,004,457 | A | | 12/1999 | Singleton |

(Continued)

OTHER PUBLICATIONS

Amoco Product Specification for Amoco Style 2130, issued May 21, 1999.

(Continued)

*Primary Examiner* — Tara Mayo-Pinnock
(74) *Attorney, Agent, or Firm* — Womble Carlyle Sandridge & Rice PLLC

(57) ABSTRACT

A reinforced silt retention sheet and systems for silt retention are provided. The reinforced silt retention sheet includes a non-woven fabric having a series of entangled polymer fibers with a reinforcing material secured within the fabric. The resultant reinforced silt retention sheet further can have openings of a desired size to enable filtering of a flow of fluid passing through the reinforced silt retention sheet.

34 Claims, 12 Drawing Sheets

U.S. PATENT DOCUMENTS

| | | | | |
|---|---|---|---|---|
| 6,093,663 | A * | 7/2000 | Ouellette et al. | 442/5 |
| 6,169,045 | B1 * | 1/2001 | Pike et al. | 442/352 |
| 6,261,445 | B1 | 7/2001 | Singleton | |
| 6,334,953 | B1 | 1/2002 | Singleton | |
| 6,416,674 | B1 | 7/2002 | Singleton et al. | |
| 6,428,693 | B2 | 8/2002 | Singleton | |
| 6,503,856 | B1 | 1/2003 | Broadway et al. | |
| 6,649,547 | B1 | 11/2003 | Arnold et al. | |
| 6,709,579 | B1 | 3/2004 | Singleton et al. | |
| 6,723,669 | B1 | 4/2004 | Clark et al. | |
| 7,074,326 | B2 | 7/2006 | Singleton | |
| 7,465,129 | B2 | 12/2008 | Singleton | |
| 2003/0159342 | A1 * | 8/2003 | Ruiz et al. | 47/24.1 |

OTHER PUBLICATIONS

Geotex, "Geotextiles for Sediment Control" Specification sheet for "Silt Fence".

* cited by examiner

REINFORCED SILT RETENTION SHEET

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part of U.S. patent application Ser. No. 10/647,758, filed Aug. 25, 2003 now abandoned, which claims priority to U.S. Provisional Application No. 60/406,176, filed Aug. 27, 2002, both of which are incorporated by reference herein in their entirety.

TECHNICAL FIELD

The present invention is directed to materials used in water runoff management and erosion control and, more specifically, to reinforced silt retention fabric materials.

BACKGROUND

Sediment has been recognized as one of the most significant water quality impairments in the United States. Historically, soil erosion was primarily considered an agricultural issue, but construction sites are receiving increased attention as more land is being developed and there is greater awareness of water quality issues. While numerous erosion and sediment control products and practices are being used in the field to reduce soil loss from construction sites, there are only few standardized tests to evaluate the effectiveness of most of these practices, and such tests are relatively complicated. Thus, there remains a need for a relatively simple test procedure for evaluating sediment control products.

As a result, silt fences have become a commonly accepted erosion and sediment control product. Most silt fences are constructed of woven geotextile fabrics, sometimes reinforced by wire, supported by metal posts. Silt fences help to impound runoff and to increase sedimentation by filtering the fluid as it flows away from the development site. While not wishing to be bound by theory, it is believed that the silt fence initially removes silt and sand particles from overland flow through filtration of the large particles, and as the larger particles block the pores in the silt fence, runoff begins to pool or "pond" behind the fence to promote sedimentation.

Installation and maintenance is a problem commonly reported with silt fences. The geotextile fabric typically is attached with fasteners to wooden or metal stakes driven into the ground to secure the fabric in position to collect and filter dirt and debris from runoff water flows. The fasteners typically include staples, hooks, rings, or similar devices that are inserted through the fabric to attach it to the stakes. However, due to their relatively thin, porous nature, geotextile fabrics usually do not exhibit enough tensile strength to avoid pulling and tearing at the insertion or puncture points of the fasteners as water, direct, and debris bear against the fabric as runoff flow passes therethrough. When the fabric pulls and tears, it frequently fails to control erosion effectively. Consequently, there is a need for geotextile fabrics and sheets that resist tearing and pulling at fastener insertion points. Additionally, undercutting and flanking of the fence can occur due to improper installation, and overtopping can occur when silt fences are improperly located in concentrated flow conditions or when the flow rate through the fence is inadequate.

Thus, there remains a need for a sediment control product, for example, a silt retention material and/or silt retention system, that features enhanced durability while effectively promoting sedimentation, thereby reducing maintenance and improving overall performance.

SUMMARY

Briefly described, the present invention generally is directed to a silt retention sheet or silt screen material having a body or web that generally is formed of woven or nonwoven filter material, such as a spunbond polypropylene, polyester, or similar flexible polymeric material that allows water to pass therethrough, but substantially prevents silt and debris from passing therethrough. The silt retention sheet further includes one or more reinforcing elements, strips, or belts attached to the web at spaced intervals along or across the width of the web. Fasteners are inserted or applied onto or through the water-permeable web of filter material at selected locations along the reinforcing strips to attach the web material to stakes or support members.

The reinforcing elements prevent ripping and tearing of the filter material at the points where the fasteners are inserted through or attached to the filter material, and further provide areas for supporting the engagement and hold of the fasteners to the filter material against heavy water flows or the accumulation of sediment and debris against the web. Some examples of the reinforcing material include woven strips of nylon, reinforcing strands of fiberglass and other rugged polymeric materials. The reinforcing elements can be applied as strands, cords, arrays, strips, patches, or lengths of material attached along the web of the silt screen material by stitching, adhesion, felting, impregnation, heat fusion, weaving, or similar means. For example, in one embodiment, the reinforced silt retention sheet includes a plurality of woven nylon strips or patches sewn onto and extending along the length of the web of filter material, with the strips spaced across the width of the web.

In another embodiment, the silt retention sheet includes a first water-permeable web on which is layered a second water-permeable web, with a reinforcing element disposed between portions of the first and second webs. The webs may be formed of woven and/or nonwoven materials and constructed to allow water to pass therethrough while helping to prevent the passage of silt and/or debris therethrough. The reinforcing element can include a plurality of reinforcing strands or strips that form a band. A series of reinforcing bands can be formed to define a reinforcing structure or array extending along selected portions of the web.

According to another aspect of the invention, a silt retention system includes various features, for example, a silt retention material, at least one stake to attach the silt retention material to, and at least one fastener for securing the silt retention material to the at least one stake. The silt retention system also may include a fastener support for further securing and stabilizing the silt retention sheet.

These and other aspects of the present invention are described in greater detail below and shown in the accompanying drawings that are briefly described as follows.

DETAILED DESCRIPTION

Figure 1:
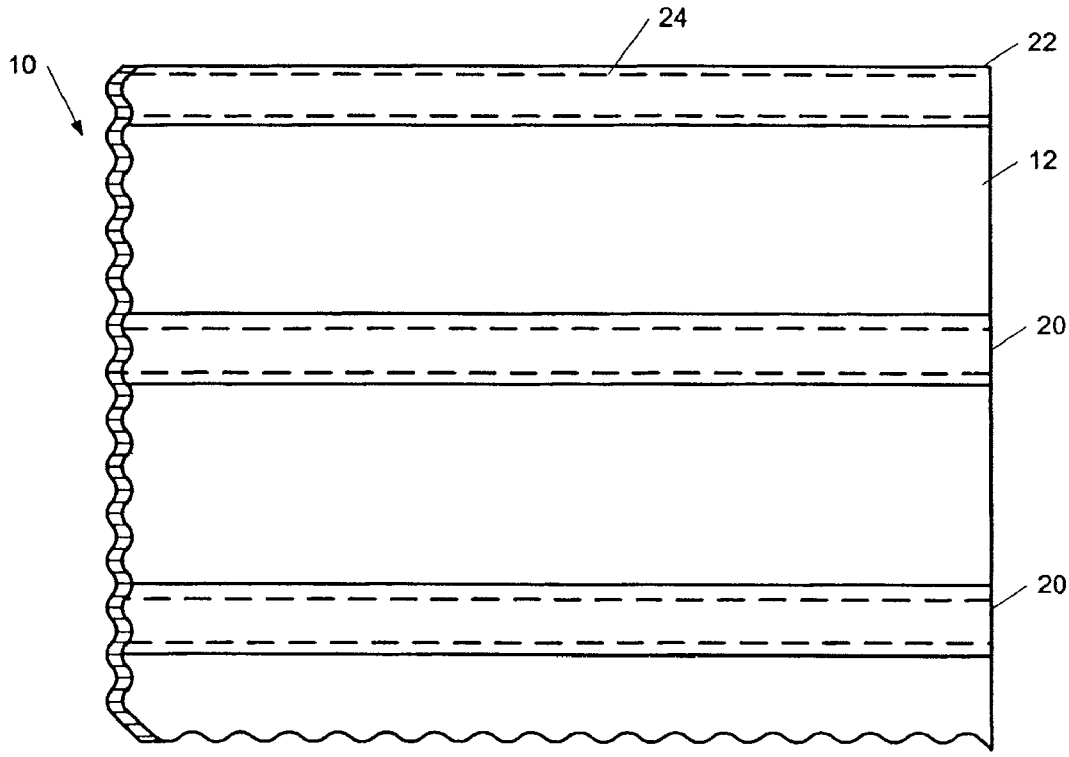
FIG. 1 is a side elevational view of a portion of a silt retention sheet encompassing principles of the present invention.

The present invention is directed generally to various erosion control materials and systems. For example, such materials may be used to retain silt suspended in stormwater flowing from development sites or other erosion-prone areas. As used herein, the term "silt" refers to soil or rock particles having a diameter of from about 1/256 mm to about 1/16 mm (about 3.9 microns to about 62.5 microns).

In one aspect, an erosion control product or system comprises a reinforced silt retention sheet including one or more webs or sheets of a substantially water-permeable material to which one or more reinforcing elements are attached and serve as points of attachment for fasteners that are used to fasten the reinforced silt retention sheets to support members to anchor the sheets in position to filter silt and debris from water passing through the sheet in soil erosion control applications. The reinforcing elements further help to reduce the incidence of tearing, pulling, and separation of the water-permeable web material at or around the points of attachment for the fasteners.

As used herein, the term "water-permeable" generally refers to the ability of an element or article to allow water to pass or flow therethrough. The flow rate of water through a "water-permeable" structure as used in the present invention generally will be sufficient for soil erosion control applications in which storm water runoff must be filtered and allowed to pass through the structure without substantial pooling or flooding around the silt retention sheet(s) when installed.

It will be understood that whether a particular material is sufficiently water-permeable will depend on the particular application for which the material is used, the composition of soil in the geographic location where the material is used, the particle size of the each component in the soil, and numerous other factors understood to those of skill in the art. Thus, while certain examples are provided herein, it will be understood that the performance criteria for a given application may vary, and that some materials may be suitable for some applications and not suitable for others.

In another aspect, a silt retention system is provided. The silt retention system may include various features, for example, a silt retention material, at least one stake to attach the silt retention material to, and at least one fastener for securing the silt retention material to the at least one stake. The silt retention system also may include a fastener support for further securing and stabilizing the silt retention sheet, and for reducing the incidence of tearing at of near the points of attachment to each stake.

Various materials are contemplated for use with the present invention, including woven materials, nonwoven materials (also referred to as nonwoven "webs" or "fabrics"), or any combination thereof formed from natural materials, synthetic materials, or any combination thereof.

As used herein, the term "woven" refers to a fabric or material made or constructed by interlacing threads or strips of material or other elements into a whole. Woven materials typically only stretch in the bias directions (between the warp and weft directions) unless the threads or other materials used to form the material are elastic.

As used herein, the term "nonwoven" material or fabric or web refers to a web having a structure of individual fibers or threads which are interlaid, but not in an identifiable manner as in a knitted fabric. Nonwoven fabrics or webs have been formed from many processes including, but not limited to spunbonding processes, meltblowing processes, bonded carded web processes, felting processes, and needlepunching processes.

As used herein the term "spunbond fibers" refers to small diameter fibers of molecularly oriented polymer formed from a spunbonding process. Spunbond fibers are formed by extruding molten thermoplastic material as filaments from a plurality of fine, usually circular capillaries of a spinneret with the diameter of the extruded filaments then being rapidly reduced.

Where the silt retention fabric is a spunbond material, the fibers may have any suitable denier as needed or desired for a particular application, and may generally be from about 1 to about 10 denier per fiber (dpf) (grams per 9000 meters of fiber). In one aspect, the denier of the reinforced silt retention fabric is from about 1.5 to about 8 dpf. In another aspect, the denier is 2 to about 7 dpf. In yet another aspect, the denier is from about 3 to about 7 dpf. In yet another aspect, the denier is from about 4 to about 5 dpf. In one particular example, the denier of the nonwoven fibers used to form the silt retention fabric is about 4.5 dpf.

As used herein the term "meltblown fibers" refers to fine fibers of unoriented polymer formed from a meltblowing process. Meltblown fibers are often formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which may be to microfiber diameter. Thereafter, the meltblown fibers are carried by the high velocity gas stream and deposited on a collecting surface to form a web of randomly disbursed meltblown fibers. Meltblown fibers may be continuous or discontinuous, and are generally smaller than 10 microns in average diameter.

As used herein, "bonded carded web" refers to webs made from staple fibers that are sent through a combing or carding unit, which breaks apart and aligns the staple fibers in the machine direction to form a generally machine direction-oriented fibrous nonwoven web. Such fibers usually are purchased in bales that are placed in a picker that separates the fibers prior to the carding unit. Once the web is formed, it then is bonded by one or more of several known bonding methods. One such bonding method is powder bonding, wherein a powdered adhesive is distributed through the web and then activated, usually by heating the web and adhesive with hot air. Another suitable bonding method is pattern bonding, wherein heated calendar rolls or ultrasonic bonding equipment are used to bond the fibers together, usually in a localized bond pattern, though the web can be bonded across its entire surface if so desired. Another suitable and well-known bonding method, particularly when using bicomponent staple fibers, is through-air bonding.

As used herein, a "felt" refers to a matted nonwoven material formed from natural and/or synthetic fibers, made by a combination of mechanical and chemical action, pressure, moisture, and heat.

As used herein, "needlepunching" refers to a process of converting batts of loose staple or continuous fibers, or a combination of staple fibers and continuous fibers, into a coherent nonwoven fabric in which barbed needles are punched through the batt, thereby entangling the fibers.

The silt retention material used in accordance with any of the various aspects of the present invention may be formed from one or more polymers or polymeric materials. As used herein the term "polymer" or "polymeric material" includes, but is not limited to, homopolymers, copolymers, such as for example, block, graft, random, and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic, and random symmetries. Typical thermoplastic polymers that may be suitable for use with the present invention include, but are not limited to, polyolefins, e.g. polyethylene, polypropylene, polybutylene, and copolymers thereof; polytetrafluoroethylene; polyesters, e.g. polyethylene terephthalate; vinyl polymers, e.g., polyvinyl chloride, polyvinyl alcohol, polyvinylidene chloride, polyvinyl acetate, polyvinyl chloride acetate, polyvinyl butyral; acrylic resins, e.g. polyacrylate, polymethylacrylate, and polymethylmethacrylate; polyamides, e.g., nylon 6,6; polystyrenes; polyurethanes; cellulosic resins, e.g., cellulosic nitrate, cellulosic acetate, cellulosic acetate butyrate, ethyl cellulose; copolymers of any of the above materials; or any blend or combination thereof.

Thus, by way of example and not by limitation, the material used in accordance with the present invention may be a woven polypropylene fabric, a nonwoven polypropylene fabric, for example, a spunbond polypropylene fabric, a woven polyethylene terephthalate fabric, a nonwoven polyethylene terephthalate fabric, for example, a spunbond polyethylene terephthalate fabric, a needlepunched polyethylene terephthalate fabric, a needlepunched spunbond polyethylene terephthalate fabric, a woven nylon fabric, woven natural fiber fabric, or any combination thereof.

One example of a woven polypropylene fabric that may be suitable for use with the present invention is commercially available from Amoco Fabrics and Fibers Company (Austell, Ga.) under the trade name PROPEX® 1198 geotextile. The properties of PROPEX® 1198 geotextile as provided by the manufacturer are presented in Table 1.

TABLE 1

| Property | Test Method | Min. Average Value (English) | Min. Average Value (Metric) |
|---|---|---|---|
| Grab tensile | ASTM-D-4632 | 300/200 lb | 1.33/.890 kN |
| Grab elongation | ASTM-D-4632 | 15% | 15% |
| Mullen burst | ASTM-D-3786 | 450 psi | 3100 kPa |
| Puncture | ASTM-D-4833 | 120 lb | 0.530 kN |
| Trapezoidal tear | ASTM-D-4533 | 65 lb | 0.285 kN |
| UV resistance | ASTM-D-4355 | 90% at 500 hr | 90% at 500 hr |
| AOS | ASTM-D-4751 | 40 sieve | 0.425 mm |
| Permittivity | ASTM-D-4491 | 0.5 sec | 0.5 sec |
| Flow rate | ASTM-D-4491 | 50 gal/min/ft$^2$ | 2035 L/min/m$^2$ |

Another example of a woven polypropylene fabric that may be suitable for use with the present invention is commercially available from Willacoochee Industrial Fabrics (Willacoochee, Ga.) under the trade name STYLE 2098 SILT FENCE fabric, described in detail in the Examples.

One example of a needlepunched spunbond polyethylene terephthalate fabric that may be suitable for use with the present invention is commercially available from Silt-Saver, Inc. (Conyers, Ga.) under the trade name BELTED SILT RETENTION FENCE fabric, described in detail in the Examples.

In this and other aspects of the present invention, the silt retention material may include one or more reinforcing elements. The reinforcing material or element may be any suitable construct or element (collectively "elements") that is capable of enhancing at least one of the tensile strength, burst strength, puncture resistance, tear strength, or the like, of the woven or nonwoven material.

The reinforcement elements generally may be formed from any strong, resilient, substantially tear resistant material as needed or desired for a particular application. Examples of such materials include, but are not limited to, woven or nonwoven polymeric materials, such as nylon 6,6, spun or woven yarns, cord materials, scrim, fiberglass, aramid fibers or other, similar high strength, flexible materials, or any combination thereof. In this and other aspects of the present invention, while various examples are provided herein, it will be understood that any suitable material may be used, such as those described above.

As one example of the numerous reinforcing materials and elements described herein, the reinforcing material may comprise a scrim formed from natural fibers, synthetic fibers, metal wire, carbon fibers, fiberglass, other materials, or any combination thereof. Some synthetic fibers that may be used to form a scrim include, but are not limited to, those made from polyolefins, such as polypropylene, polyethelene, and copolymers thereof; polyamides, such as nylon 6,6,; polyesters, such as polyethylene terephthalate; vinyl polymers, such as polyvinyl chloride; and any combination thereof. Other suitable polymers described herein or contemplated hereby also may be used.

A scrim used in accordance with the present invention may have any suitable fiber size, denier, and weave as needed or desired for a particular application. For example, the scrim may be from about 0.01 inch to about 1 inch mesh. In one aspect, the scrim is from about 0.1 inch to about 0.8 inch mesh. In another aspect, the scrim is from about 0.15 inch to about 0.5 inch mesh. In yet another aspect, the scrim is from about 0.2 inch mesh to about 0.4 inch mesh. In one particular example, the scrim is about 0.25 in mesh.

The reinforcing element may be attached to or incorporated into the silt retention material using any suitable method, process, or technique. By way of example and not limitation, the reinforcing element may be mechanically attached, for example, by stitches, hook-and-loop fasteners, staples, snaps, clips, or any combination thereof, adhesively attached, for example, by gluing, thermally attached, for example, by fusing or ultrasonic bonding, or any combination thereof.

Alternatively or additionally, the reinforcing element may be integrally formed with the silt retention material, for example, by weaving or by incorporating the element into the nonwoven material during manufacture. Thus, the silt retention sheet may comprise a nonwoven fabric having a reinforcing element embedded within the entangled nonwoven fibers. The silt retention sheet may be formed, for example, by depositing one or more layers of nonwoven fibers on a moving wire, depositing the reinforcing material and/or element(s) thereon, and depositing one or more layers of additional fibers over the reinforcing material such that the fibers overlie and substantially encompass the with the reinforcing material and or element(s).

If desired, the resulting structure may be subject to one or more additional processes as is known to those in the art. For example, the resulting structure may be subject to a mechanical entanglement process to enmesh the various layers of fiber and the reinforcing material. As a result, the reinforcing material is secured within the fibers by mechanical entrapment in the absence of thermal or adhesive bonding or fusing to or with the nonwoven fibers. One example of a system that includes such a material is commercially available from Silt-Saver, Inc. (Conyers, Ga.) under the trade name BELTED SILT RETENTION FENCE, described in detail in the Examples.

Alternatively, the reinforcing element may be secured within the fibers by mechanical entrapment with only minimal bonding or fusing to the nonwoven fibers. Such materials may be formed according to numerous processes. For example, where the reinforcing element is formed from a polymer or other material capable of softening in response to heat, the polymer used to form the nonwoven fibers may be selected such that the nonwoven fibers have a lower softening point than the reinforcing element. The structure then can be through air bonded or point bonded at a temperature above the softening point of the entangled polymeric fibers but below the softening point of the reinforcing element. By doing so, the softened polymer fibers fuse primarily to other softened polymer fibers, but also may bond somewhat to the reinforcing element. Thus, the reinforcing element may be secured within the fibers by mechanical entrapment in the absence of substantial bonding or fusing to the nonwoven fibers.

As another example, the reinforcing material may be secured within the fibers by mechanical entrapment and also is thermally, adhesively, and/or mechanically bonded or otherwise attached to the nonwoven fibers. Such materials may be formed by numerous processes. For example, the reinforcing material and the polymer used to form the reinforcing element may be selected to have a particular softening point, and the resulting structure may be point bonded or through air bonded at a temperature above the softening point of each to fuse the polymeric fibers and the reinforcing material and increase the integrity of the resulting nonwoven fabric.

Various aspects of present invention may be illustrated further by referring to the figures. For purposes of simplicity, like numerals may be used to describe like features. It will be understood that where a plurality of similar features are depicted, not all of such features are necessarily labeled on each figure. While various examples are shown and described in detail herein, it also will be understood that any reinforcing material may be used with any silt retention material described herein or contemplated hereby.

In FIG. 1, a reinforced silt retention sheet 10 generally includes a sheet, blanket, or web 12 comprising a geotextile fabric or other, similar water-permeable filter material to which reinforcement elements or belts 20 are attached in spaced series. In this and other aspects of the present invention, the water-permeable web of filter material 12 can be formed any suitable from woven or nonwoven, natural or synthetic material. In this example, the reinforcement elements 20 are applied to the water-permeable web 12 such as with lines of stitching 24. However, as discussed above, the reinforcement elements 20 may be attached to the water-permeable web 12 by any other appropriate means, such as adhesives, hook-and-loop fasteners, staples, etc., or any combination thereof. The reinforcement belts support and provide reinforcement points at which fasteners can be attached to the web 12 for securing the web to stakes or other supports.

As shown in FIG. 1, the exemplary reinforced silt retention sheet 10 also includes a reinforcement border 22 attached to the edge of the water-permeable web 12. The reinforcement border 22 further helps to strengthen the water-permeable web 12 and provide an additional area for attaching fasteners thereto.

Figure 2:
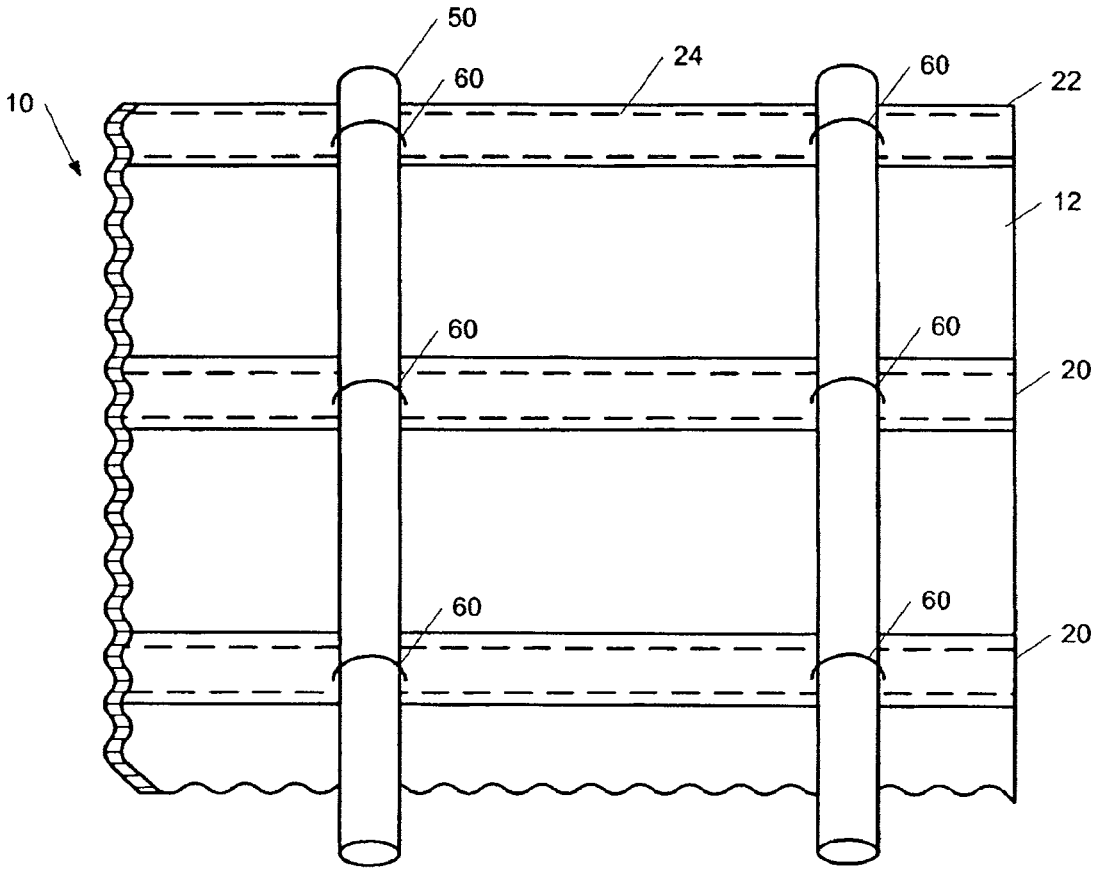
FIG. 2 is a side elevational view of a portion of the silt retention sheet of FIG. 1 fastened to support members.

FIG. 2 shows the reinforced silt retention sheet 10 of FIG. 1 fastened to ground supports, such as stakes 50, by fasteners 60. The stakes 50 typically are wooden or metal, but can be formed from of any other resilient, durable material capable of supporting the web. In this and other aspects of the invention, the fasteners 60 may include staples, pins, nails, rings, clips, or any other suitable fastener for securing the web to the stakes, depending on the type of stakes used. The fasteners 60 are fastened to the stakes 50 and inserted through the reinforcement elements 20 and the reinforcement border 22 to retain the sheet 10 in place. In this manner, the sheet 10 may be securely positioned at desired locations for filtering runoff waterflows passing through the water-permeable web 12 while preventing the passage of silt or debris therethrough.

The reinforcement elements help support the web on the stakes 50 by providing enhanced strength at the points of engagement of the fasteners 60 with the web to resist tearing of the web as silt and dirt build up thereagainst.

Figure 3:
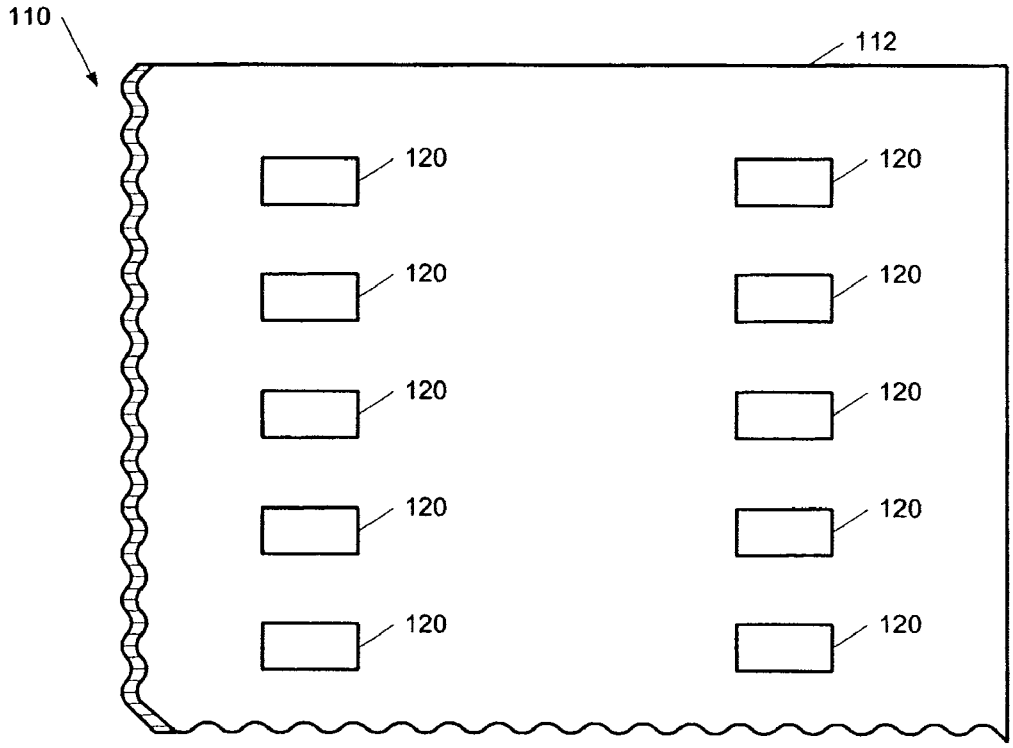
FIG. 3 is a side elevational view of a portion of an additional embodiment of a silt retention sheet encompassing principles of the present invention.

FIG. 3 shows an alternative embodiment of a reinforced silt retention sheet 110 according to the present invention. In this embodiment, the reinforcement elements 120 generally comprise patches or strips distributed or applied at selected locations across the sheet of the water-permeable material or web 112. The reinforcement elements 120 may be attached to the water-permeable web 112 as discussed above with regard to attachment of the reinforcement elements 20 to web 12. As discussed above, the water-permeable web 112 of the present invention may be any suitable material used to retain silt and debris while allowing passage of water therethrough. The reinforcement elements 120 may be distributed along the sheet 110 in any appropriate or desired number or pattern to provide multiple spaced areas of reinforcement and/or attachment. The web is attached via fasteners applied through the reinforcement elements to attach the web to supports such as stakes and prevent or resist tearing or pulling of the web away from the supports as water passes therethrough.

Figure 4:
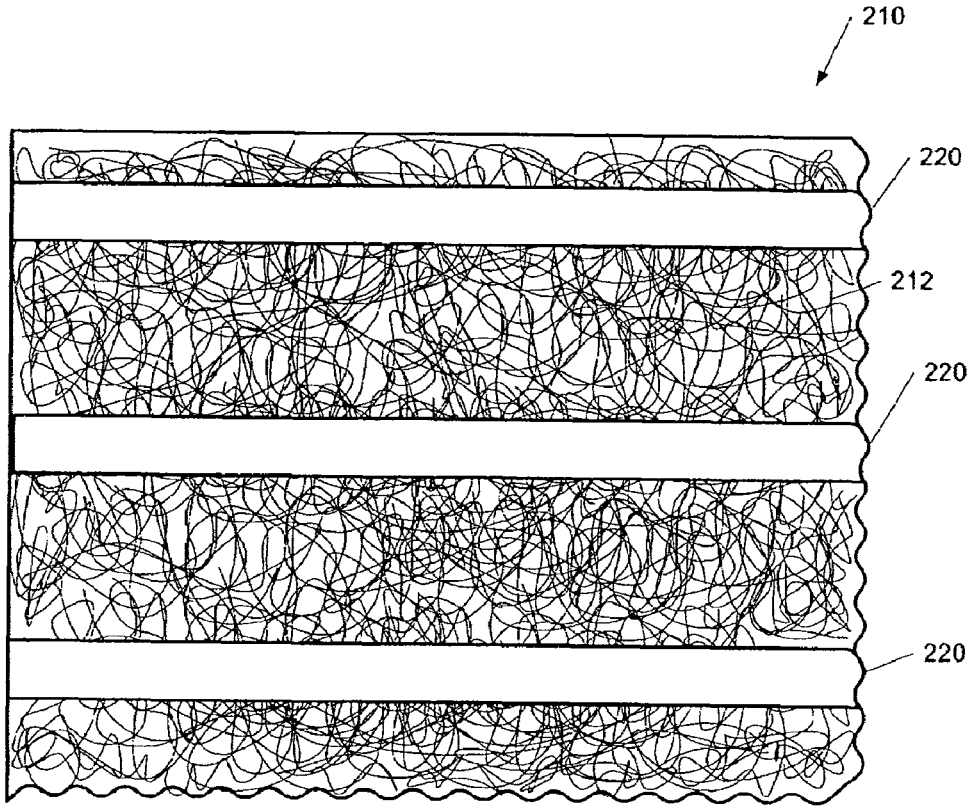
FIG. 4 is a side elevational view of a portion of yet another embodiment of a silt retention sheet encompassing principles of the present invention.

FIG. 4 illustrates another example of a reinforced silt retention sheet according to the present invention. In this embodiment, the silt retention sheet 210 is formed of a nonwoven, water-permeable web 212 composed of a suitable polymeric material. Reinforcing elements 220 are attached at spaced locations across the width of the web 212 by appropriate means, such as stitching, adhesion, felting, stapling, riveting, etc. The reinforcing elements 220 in this embodiment generally are bands that extend longitudinally along portions of the web 212 to provide points of attachment of fasteners to the sheet 210. The bands may be formed of various materials, such as woven polymeric belts, plastic strips, twisted or spun yarns, cord, ropes, spun fibers such as fiberglass, or other suitable structures. The reinforcing bands 220 enable attachment of the web 212 to ground supports with various desired spacing between the supports as needed.

Figure 5:
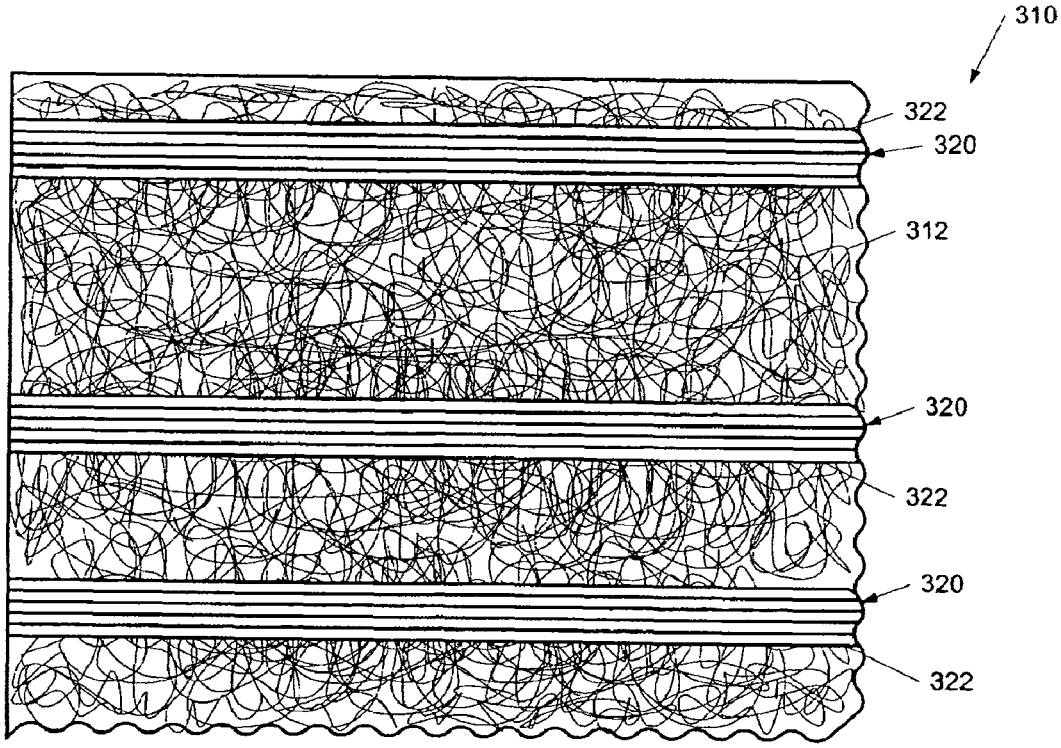
FIG. 5 is a side elevational view of a portion of still another embodiment of a silt retention sheet encompassing principles of the present invention.

FIG. 5 shows yet another embodiment of a reinforced silt retention sheet 310. As with the silt retention sheet 210 shown in FIG. 4, the silt retention sheet 310 generally includes a water-permeable, woven, or nonwoven filtering material body or web 312 to which a series of reinforcing elements 320 are attached. The reinforcing elements 320 generally are composed of a plurality of reinforcing strips or strands 322 that are aligned in proximity with each other to form bands extending along the web 312. The reinforcing strands 322 may be formed from various materials including, but not limited to, polymeric filaments, such as polypropylene, polyester, or nylon 6,6, spun or woven yarns, cord materials, scrim, fiberglass, aramid fibers or other, high strength, flexible materials, or any combination thereof.

As shown in FIG. 5, the reinforcing strands 322 are aligned in proximity to each other but do not intertwine or overlap. The reinforcing strands 322 can be attached by a variety of means to the web 312, including threading or weaving the strands through the web, felting, heat fusion or simply can be disposed within the web 312 during manufacture of the web.

The proximity of the reinforcing strands 322 to each other to form the reinforcing elements 320 tends to increase the strength of the sheet 310 in and around the reinforcing elements 320, even though the reinforcing strands do not intertwine or overlap. Nonetheless, the reinforcing strands 320 impart sufficient strength to the silt retention sheet 310 to reduce the incidents of tearing, separation, and pulling of the web 312 when the sheet 310 is fastened to support members by fasteners attached to the sheet 310 at the reinforcing elements 320, as discussed above with reference to the sheet 10 of FIGS. 1 and 2.

Figure 6:
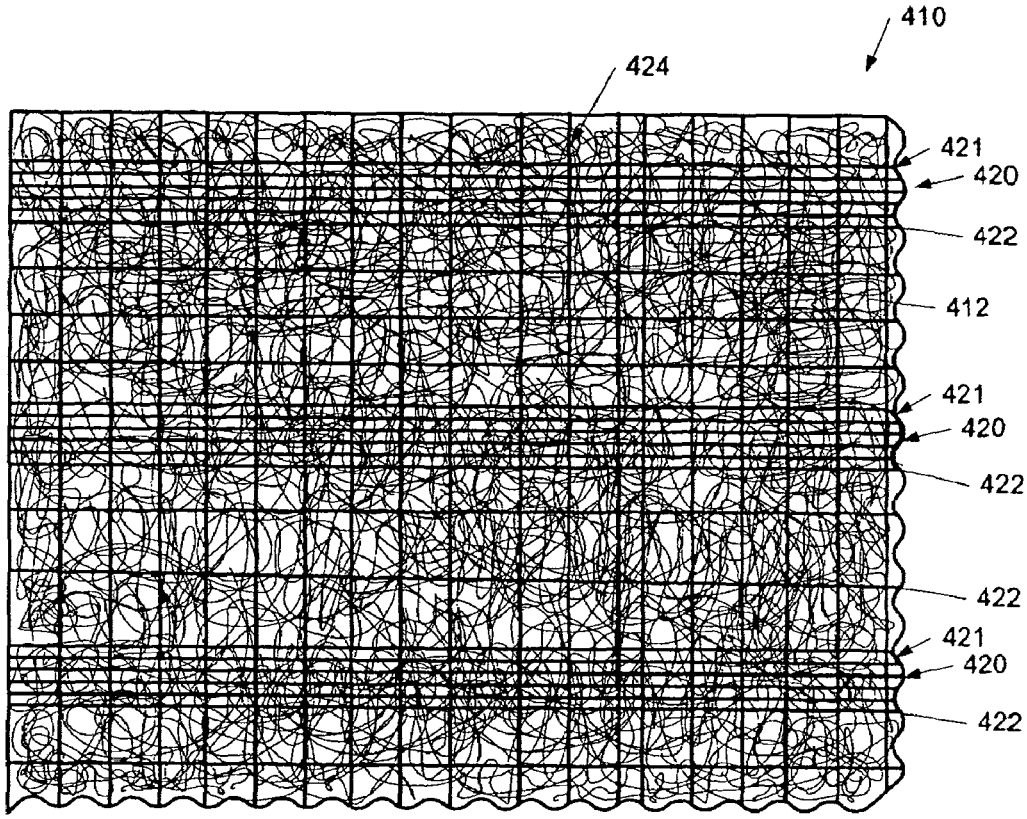
FIG. 6 is a side elevational view of a portion of another alternative embodiment of a silt retention sheet encompassing principles of the present invention.

FIG. 6 shows a further alternative silt retention sheet 410 of the present invention in which an array 424 of reinforcing strands 422 is provided. As shown in FIG. 6, the reinforcing strands of the array 424 intersect and overlap each other across at least a portion of the silt retention sheet 410. The array 424 further typically can include one or more bands 421 of reinforcing materials that make up the reinforcing elements 420. The bands 421 generally are composed of two or more reinforcing strands 422 that are aligned adjacent to each other in closer proximity than the other strands within the array 424. The reinforcing strands of the bands 421 generally are aligned parallel to each other and may contact or overlap each other to form the bands 421. In this embodiment, the reinforcing elements 420 constitute areas along the sheet 410 that have higher concentrations of reinforcing strands 422 than the average concentration of strands on the sheet 410. The array 424 of reinforcing strands generally strengthens the web 412 to which it is attached. In the example shown in FIG. 6, the web 412 is composed of a nonwoven material, such as a spunbond polypropylene or polyester, or any of the other materials described herein or contemplated hereby. The reinforcing strands of the reinforcing elements 420 and the array 424 may be attached to the web 412 by various means, such as adhesion, heat fusion, impregnation, weaving, stitching, felting, etc.

Figure 7:
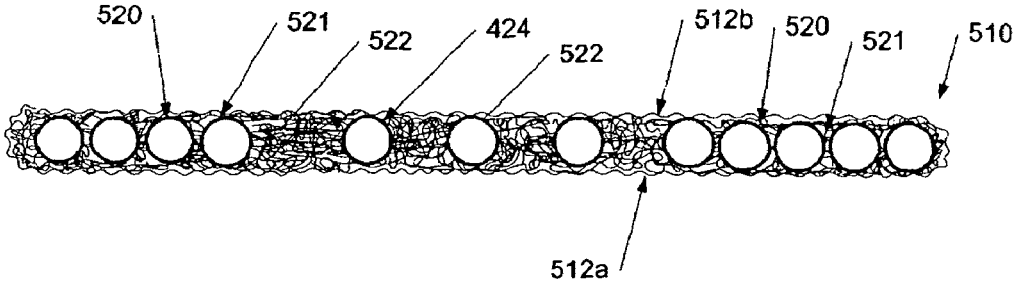
FIG. 7 is a side view of a portion of a further alternative embodiment of a silt retention sheet encompassing principles of the present invention.

FIG. 7 shows a further alternative embodiment of the reinforced silt retention sheet 510, which includes a first water-permeable nonwoven web 512a on which is layered on a second water-permeable nonwoven web 512b. As used herein, the term "layered on" refers to the orientation of one article or element relative to another and generally means that at least a portion of one element is applied to another element in an overlapping and parallel relationship. An array 524 of reinforcing strands is disposed between the first and second webs 512a and 512b and includes one or more bands 521 formed of reinforcing strands that constitute reinforcing elements 520 of the sheet 510. Although the webs 512a and 512b shown in FIG. 7 generally are nonwoven, the silt retention sheets may be formed from woven webs, as discussed above. For example, the reinforced silt retention sheet of the present invention may include one or more nonwoven water permeable webs layered on one or more woven water-permeable webs that tend to prevent the passage of silt and debris therethrough. The webs may be layered upon and secured to each other using various means, such as adhesion, interweaving, stitching, felting, heat fusion, etc. Although FIG. 7 depicts an array 524 of reinforced strands that form in part the reinforcing elements 520 of the sheet 510, it is to be understood that, in this and other aspects of the invention, other reinforcing elements and combinations thereof shown in the various embodiments may be incorporated into a sheet in which two or more webs are layered on each other.

The reinforced silt retention fabric may be designed to have various properties, as needed or desired for a particular application. It will be understood by those of skill in the art that depending on the particular application and the particular jurisdiction in which the silt retention material is used, various minimum physical property and performance requirements may apply. By way of example, and not by limitation, the minimum requirements for the state of Georgia for various applications are presented in Tables 1 and 2 (Manual for Erosion and Sediment Control in Georgia, 2000).

TABLE 1

| Application Type | Description |
|---|---|
| A | This 36-inch wide filter fabric shall be used on developments where the life of the project is greater than or equal to six months. |
| B | Though only 22-inches wide, this filter fabric allows the same flow rate as Type A silt fence. Type B silt fence shall be limited to use on minor projects, such as residential home sites or small commercial developments where permanent stabilization will be achieved in less than six months. |
| C | Type C fence is 36-inches wide with wire reinforcement. The wire reinforcement is necessary because this fabric allows almost three times the flow rate as Type A silt fence. Type C silt fence shall be used where runoff flows or velocities are particularly high or where slopes exceed a vertical height of 10 feet. Provide a riprap splash pad or other outlet protection device for any point where flow may top the sediment fence. Ensure that the maximum height of the fence at a protected, reinforced outlet does not exceed 1 ft. and that support post spacing does not exceed 4 ft. |

TABLE 2

| Property | Type A | Type B | Type C |
|---|---|---|---|
| Minimum tensile strength (lb) (ASTM D-4632) (min. roll average of 5 specimens) | Warp - 120 Fill - 100 | Warp - 120 Fill - 100 | Warp - 260 Fill - 180 |
| Maximum elongation (%) (ASTM D-4632) | 40 | 40 | 40 |
| AOS - Apparent opening size (max. sieve size) (ASTM D-4751) | #30 (0.595 mm) | #30 (0.595 mm) | #30 (0.595 mm) |
| Flow Rate (gal/min/sq.ft.) (GDT-87) | 25 | 25 | 70 |
| Ultraviolet stability (% of required initial minimum tensile strength) (ASTM D-4632 after 300 hours weathering per ASTM D-4355) | 80 | 80 | 80 |
| Bursting strength (psi) (ASTM D-3786) | 175 | 175 | 175 |
| Minimum fabric width (in.) | 36 | 22 | 36 |

The reinforced silt retention fabric may have any suitable basis weight as needed or desired for a particular application, and generally may be from about 35 to about 275 grams per square meter (gsm). In one aspect, the basis weight of the reinforced silt retention fabric is from about 50 to about 200 gsm. In another aspect, the basis weight is about 75 to about 150 gsm. In yet another aspect, the basis weight is from about 100 to about 130 gsm. In one particular example, the basis weight of the reinforced silt retention fabric is about 120 gsm.

The reinforced silt retention fabric may have any suitable thickness as needed or desired for a particular application, and generally may be from about 0.1 to about 5 millimeters (mm). In one aspect, the thickness is from about 0.15 to about 3 mm. In another aspect, the thickness is from about 0.2 to about 2 mm. In yet another aspect, the thickness is from about 0.25 to about 1 mm. In another aspect, the thickness is from about 0.3 to about 0.7 mm. In one particular example, the thickness of the reinforced silt retention sheet is about 0.4 mm.

The reinforced silt retention fabric generally may have a maximum apparent opening size (AOS) of 0.595 mm (30 mesh) or less, as measured according to ASTM D-4751. In one aspect, the maximum AOS is 0.595 mm. In another aspect, the maximum AOS is 0.500 mm (35 mesh). In another aspect, the maximum AOS is 0.420 mm (40 mesh). In still another aspect, the maximum AOS is 0.354 mm (45 mesh). In yet another aspect, the maximum AOS is 0.297 mm (50 mesh). In another aspect, the maximum AOS is 0.250 mm (60 mesh). In yet another aspect, the maximum AOS is 0.210 mm (70 mesh). In still another aspect, the maximum AOS is 0.177 (80 mesh).

In another aspect, the maximum AOS is less than 0.595 mm. In yet another aspect, the maximum AOS is less than 0.500 mm. In another aspect, the maximum AOS is less than 0.420 mm. In still another aspect the maximum AOS is less than 0.354 mm. In yet another aspect, the maximum AOS is less than 0.297 mm. In another aspect, the maximum AOS is less than 0.250 mm. In yet another aspect, the maximum AOS is less than 0.210 mm.

The reinforced silt retention fabric may have any suitable flow rate therethrough as measured according to ASTM D-4491, and may generally be from about 35 to about 160 gallons/minute/square foot (gal/min/sqft). In one aspect, the flow rate is from about 50 to about 140 gal/min/sqft. In another aspect, the flow rate is from about 70 to about 125 gal/min/sqft. In yet another aspect, the flow rate is from about 80 to about 100 gal/min/sqft. In another aspect, the flow rate is at least about 50 gal/min/sqft. In still another aspect, the flow rate is at least about 70 gal/min/sqft. In a further aspect, the flow rate is at least about 90 gal/min/sqft. In another aspect, the flow rate is greater than 50 gal/min/sqft. In one particular example, the water flow rate through the reinforced silt retention fabric is about 95 gal/min/sqft.

The reinforced silt retention fabric generally may have a tensile strength of at least about 100 lb in the warp (machine) direction ("warp tensile strength"), as measured according to ASTM D-4632. In one aspect, the warp tensile strength is at least about 125 lb. In another aspect, the warp tensile strength is at least about 150 lb. In yet another aspect, the warp tensile strength is at least about 175 lb. In another aspect, the warp tensile strength is at least about 200 lb. In still another aspect, the warp tensile strength is from about 100 to about 150 lb. In another aspect, the warp tensile strength is from about 200 to about 300 lb. In another aspect, the warp tensile strength is from about 100 to about 350 lb. In one particular example, the warp tensile strength of the reinforced silt retention fabric is about 124 lb.

The reinforced silt retention fabric generally may have a tensile strength of at least about 75 lb in the fill (cross machine) direction ("fill tensile strength"), as measured according to ASTM D-4632. In one aspect, the fill tensile strength is at least about 100 lb. In another aspect, the fill tensile strength is at least about 125 lb. In yet another aspect, the fill tensile strength is at least about 150 lb. In another aspect, the fill tensile strength is at least about 175 lb. In still another aspect, the fill tensile strength is from about 75 to about 100 lb. In another aspect, the fill tensile strength is from about 75 to about 150 lb. In yet another aspect, the fill tensile strength is from about 150 to about 250 lb. In another aspect, the fill tensile strength is from about 75 to about 450 lb. In one particular example, the fill tensile strength of the reinforced silt retention fabric is about 88 lb.

The reinforced silt retention fabric generally may have a trapezoidal tear strength in the warp direction ("warp trapezoidal tear strength") of at least about 10 decaNewtons (dN), as measured according to ASTM D-4533. In one aspect, the warp trapezoidal tear strength is at least about 15 dN. In another aspect, the warp trapezoidal tear strength is at least about 20 dN. In still another aspect, the warp trapezoidal tear strength is from about 15 to about 60 dN. In another aspect, the warp trapezoidal tear strength is from about 17 to about 40 dN. In yet another aspect, the warp trapezoidal tear strength is from about 20 to about 30 dN. In one particular example, the warp trapezoidal tear strength of the reinforced silt retention fabric is about 22 dN.

The reinforced silt retention fabric generally may a trapezoidal tear strength in the fill direction ("fill trapezoidal tear strength") of at least about 10 dN, as measured according to ASTM D-4533. In one aspect, the fill trapezoidal tear strength is at least about 15 dN. In another aspect, the fill trapezoidal tear strength is at least about 18 dN. In still another aspect, the fill trapezoidal tear strength is from about 12 to about 50 dN. In another aspect, the fill trapezoidal tear strength is from about 15 to about 40 dN. In yet another aspect, the fill trapezoidal tear strength is from about 18 to about 30 dN. In one particular example, the fill trapezoidal tear strength of the reinforced silt retention fabric is about 20 dN.

The reinforced silt retention fabric generally may have puncture strength of at least about 12 dN, as measured according to ASTM D-4533. In one aspect, the puncture strength is at least about 18 dN. In another aspect, the puncture strength is at least about 20 dN. In still another aspect, the puncture strength is from about 12 to about 75 dN. In another aspect, the puncture strength is from about 15 to about 50 dN. In yet another aspect, the puncture strength is from about 18 to about 30 dN. In one particular example, the puncture strength of the reinforced silt retention fabric is about 24 dN.

The reinforced silt retention fabric generally may have a mullen burst strength at least about 150 psi, as measured according to ASTM D-3786. In one aspect, the mullen burst strength is at least about 200 psi. In another aspect, the mullen burst strength is at least about 250 psi. In yet another aspect, the mullen burst strength is at least about 300 psi. In another aspect, the mullen burst strength is at least about 350 psi. In still another aspect, the mullen burst strength is at least about 400 psi. In another aspect, the mullen burst strength is t least about 500 psi. In still another aspect, the mullen burst strength is from about 150 to about 450 psi. In yet another aspect, the mullen burst strength is from about 175 to about 300 psi. In one particular example, the mullen burst strength of the reinforced silt retention fabric is about 206 psi.

The reinforced silt retention fabric generally may have a standard concentration filtering efficiency of at least about 85%, as measured according to ASTM D-5141-96(2004). In one aspect, the standard concentration filtering efficiency is at least about 90%. In another aspect, the standard concentration filtering efficiency is at least about 92%. In another aspect, the standard concentration filtering efficiency is at least about 94%. In yet another aspect, the standard concentration filtering efficiency is at least about 96%. In still another aspect, the standard concentration filtering efficiency of the reinforced silt retention fabric is at least about 98%. In still another aspect, the standard concentration filtering efficiency is greater than 97% for sand. In still another aspect, the standard concentration filtering efficiency is greater than 87% for silt. In yet another aspect, the standard concentration filtering efficiency is greater than 90% for clay.

The reinforced silt retention fabric generally may have a standard concentration reduction in turbidity of at least about 20%, as measured according to ASTM D-5141-96(2004). In one aspect, the standard concentration reduction in turbidity is at least about 35%. In another aspect, the standard concentration reduction in turbidity is at least about 50%. In yet another aspect, the standard concentration reduction in turbidity is at least about 65%. In still another aspect, the standard concentration reduction in turbidity of the reinforced silt retention fabric is at least about 80%.

In another aspect, the standard concentration reduction in turbidity is greater than 25% for sand. In yet another aspect, the standard concentration reduction in turbidity is greater than 30% for sand. In another aspect, the standard concentration reduction in turbidity is greater than 35% for sand. In still another aspect, the standard concentration reduction in turbidity is greater than 40% for sand. In another aspect, the standard concentration reduction in turbidity is greater than 45% for sand. In yet another aspect, the standard concentration reduction in turbidity is greater than 40% for sand. In another aspect, the standard concentration reduction in turbidity is greater than 45% for sand. In a further aspect, the standard concentration reduction in turbidity is greater than 50% for sand. In another aspect, the standard concentration reduction in turbidity is greater than 55% for sand.

In yet another aspect, the standard concentration reduction in turbidity is greater than 58% for silt. In another aspect, the standard concentration reduction in turbidity is greater than 60% for silt. In still another aspect, the standard concentration reduction in turbidity is greater than 65% for silt. In yet another aspect, the standard concentration reduction in turbidity is greater than 70% for silt. In another aspect, the standard concentration reduction in turbidity is greater than 75% for silt. In yet another aspect, the standard concentration reduction in turbidity is greater than 80% for silt.

In another aspect, the standard concentration reduction in turbidity is greater than 51% for clay. In yet another aspect, the standard concentration reduction in turbidity is greater than 55% for clay. In still another aspect, the standard concentration reduction in turbidity is greater than 60% for clay. In another aspect, the standard concentration reduction in turbidity is greater than 65% for clay. In yet another aspect, the standard concentration reduction in turbidity is greater than 70% for clay. In another aspect, the standard concentration reduction in turbidity is greater than 75% for clay. In still another aspect, the standard concentration reduction in turbidity is greater than 80% for clay.

The reinforced silt retention fabric generally may have a double concentration filtering efficiency of at least about 90%, as measured according to ASTM D-5141-96(2004). In one aspect, the double concentration filtering efficiency is at least about 92%. In another aspect, the double concentration filtering efficiency is at least about 94%. In yet another aspect, the double concentration filtering efficiency is at least about 96%. In still another aspect, the double concentration filtering efficiency of the reinforced silt retention fabric is at least about 98%.

In another aspect, the double concentration filtering efficiency is greater than 97% for sand. In yet another aspect, the double concentration filtering efficiency is greater than 98% for sand.

In still another aspect, the double concentration filtering efficiency is greater than 90% for silt. In another aspect, the double concentration filtering efficiency is greater than 92% for silt. In yet another aspect, the double concentration filtering efficiency is greater than 94% for silt. In still another aspect, the double concentration filtering efficiency is greater than 96% for silt.

In yet another aspect, the double concentration filtering efficiency of the reinforced silt retention fabric is greater than 91% for clay. In another aspect, the double concentration filtering efficiency of the reinforced silt retention fabric is greater than 93% for clay. In yet another aspect, the double concentration filtering efficiency of the reinforced silt retention fabric is greater than 95% for clay. In still another aspect, the double concentration filtering efficiency of the reinforced silt retention fabric is greater than 97% for clay.

The reinforced silt retention fabric generally may have a double concentration reduction in turbidity of at least about 20%, as measured according to ASTM D-5141-96(2004). In one aspect, the double concentration reduction in turbidity is at least about 35%. In another aspect, the double concentration reduction in turbidity is at least about 50%. In yet another aspect, the double concentration reduction in turbidity is at least about 65%. In still another aspect, the double concentration reduction in turbidity of the reinforced silt retention fabric is at least about 80%.

In another aspect, the double concentration reduction in turbidity is greater than 31% for sand. In yet another aspect, the double concentration reduction in turbidity is greater than 35% for sand. In another aspect, the double concentration reduction in turbidity is greater than 40% for sand. In still another aspect, the double concentration reduction in turbidity is greater than 45% for sand. In another aspect, the double concentration reduction in turbidity is greater than 50% for sand.

In another aspect, the double concentration reduction in turbidity is greater than 58% for silt. In yet another aspect, the double concentration reduction in turbidity is greater than 60% for silt. In still another aspect, the double concentration reduction in turbidity is greater than 65% for silt. In yet another aspect, the double concentration reduction in turbidity is greater than 70% for silt. In another aspect, the double concentration reduction in turbidity is greater than 75% for silt. In yet another aspect, the double concentration reduction in turbidity is greater than 80% for silt. In a further aspect, the double concentration reduction in turbidity is greater than 85% for silt.

In another aspect, the double concentration reduction in turbidity is greater than 45% for clay. In yet another aspect, the double concentration reduction in turbidity is greater than 50% for clay. In another aspect, the double concentration reduction in turbidity is greater than 55% for clay. In still another aspect, the double concentration reduction in turbidity is greater than 60% for clay. In another aspect, the double concentration reduction in turbidity is greater than 65% for clay. In a further aspect, the double concentration reduction in turbidity is greater than 70% for clay. In another aspect, the double concentration reduction in turbidity is greater than 75% for clay. In yet another aspect, the double concentration reduction in turbidity is greater than 80% for clay.

The reinforced silt retention fabric generally may have a standard concentration filtering efficiency greater than about 80% for silt as measured according to modified ASTM D-5141-96(2004), described in Example 2. In one aspect, the standard concentration filtering efficiency is greater than 84% for silt. In another aspect, the standard concentration filtering efficiency is greater than 86% for silt. In yet another aspect, the standard concentration filtering efficiency is greater than 86% for silt.

The reinforced silt retention fabric generally may have a standard concentration reduction in turbidity of greater than about 40% for silt, as measured according to modified ASTM D-5141-96(2004). In one aspect, the standard concentration reduction in turbidity is greater than 46% for silt. In another aspect, the standard concentration reduction in turbidity is greater than 50% for silt. In yet another aspect, the standard concentration reduction in turbidity is greater than 55% for silt. In still another aspect, the standard concentration reduction in turbidity is greater than 60% for silt.

The reinforced silt retention fabric generally may have a double concentration filtering efficiency greater than about 80% for silt as measured according to modified ASTM D-5141-96(2004). In one aspect, the double concentration filtering efficiency is greater than 85% for silt. In another aspect, the double concentration filtering efficiency is greater than 87% for silt. In another aspect, the double concentration filtering efficiency is greater than 89% for silt. In another aspect, the double concentration filtering efficiency is greater than 90% for silt.

The reinforced silt retention fabric generally may have a double concentration reduction in turbidity of greater than about 50% for silt, as measured according to modified ASTM D-5141-96(2004). In one aspect, the double concentration reduction in turbidity is greater than 53% for silt. In one aspect, the double concentration reduction in turbidity is greater than 55% for silt. In another aspect, the double concentration reduction in turbidity is greater than 60% for silt. In yet another aspect, the double concentration reduction in turbidity is greater than 65% for silt. In another aspect, the double concentration reduction in turbidity is greater than 70% for silt.

The reinforced silt retention sheet typically has a width of about 1 to about 4 feet, though greater or lesser widths can be used depending upon the application or use, and generally will be unrolled or fed out and cut to a desired length. In one aspect, the silt retention sheet has a width of from about 18 to about 26 inches, for example, about 22 inches. In another aspect, the silt retention sheet has a width of from about 32 to about 40 inches, for example, about 36 inches. In yet another aspect, the silt retention sheet has a width that is at least about 15 inches, for example, at least about 20 inches.

Figure 8:
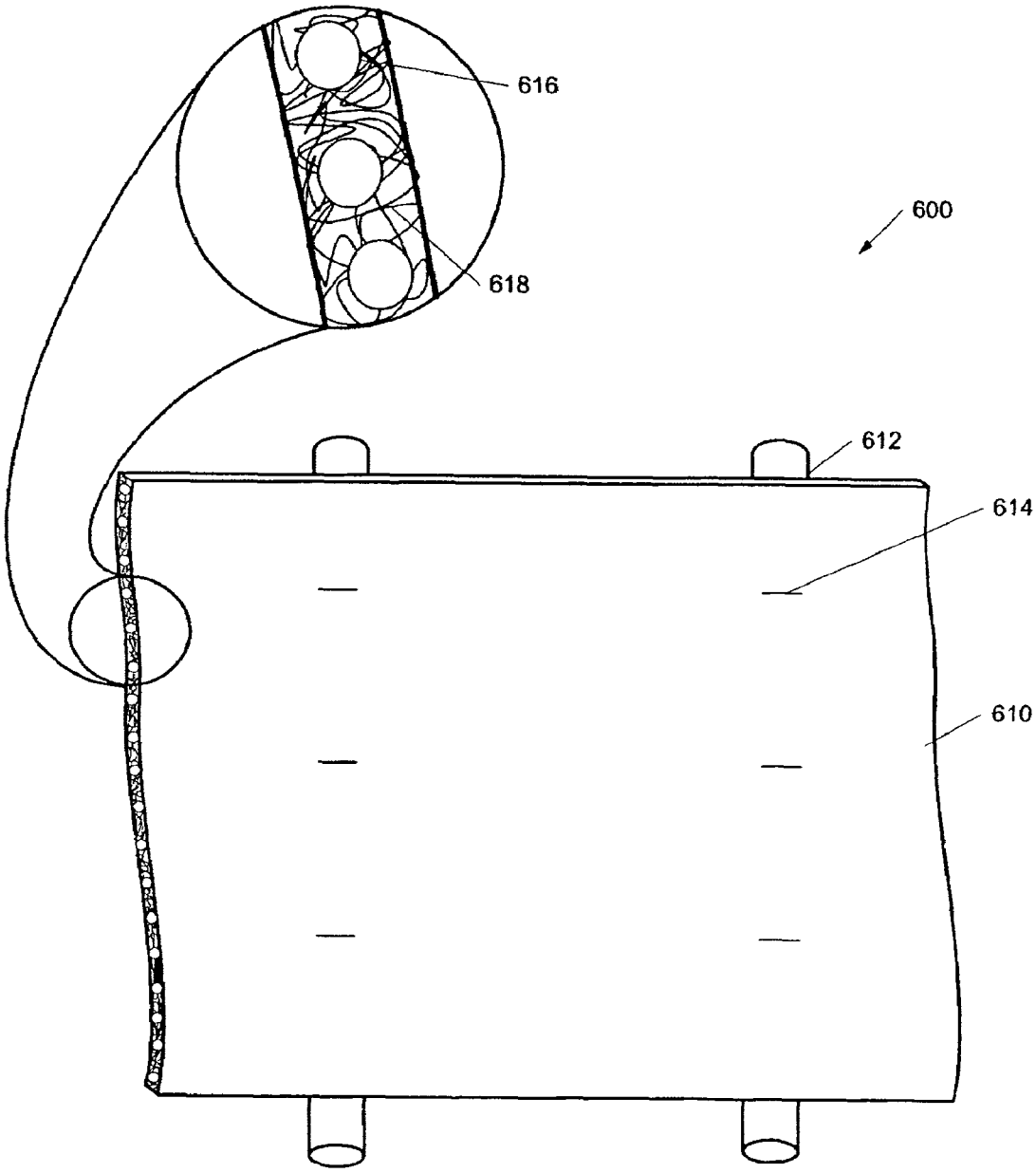
FIG. 8 is an exploded view of an another exemplary silt retention material and system including such a material according to various aspects of the present invention.

According to another aspect of the present invention, a silt retention system is provided. In one variation of this aspect shown in FIG. 8, the system includes a silt retention sheet 610, at least one stake 612, and at least one fastener 614. To assemble the silt retention system into a silt retention fence 600, a stake 612 is inserted into the soil (not shown), the silt retention sheet 610 is aligned with the stake 612, and the fastener 614 is inserted through the sheet 610 into the stake 612. This process is repeated until the desired silt retention fence or system is attained.

It will be understood that the various components may be assembled in various other orders, as desired. Also, it will be understood that the fastener may be inserted through the stake or through the sheet, provided that the sheet is securely attached. If desired, the silt retention system may be pre-assembled, such that the stakes are pre-attached to the silt retention fabric using the fasteners. In such an instance, the system may be rolled up, folded, wound onto a support roll, or the like, for easy transportation and assembly. The stakes then would be inserted into the soil as desired.

Any silt retention fabric may be used, including but not limited to, those described herein or contemplated hereby. In one exemplary system according to this aspect, the system includes a scrim-reinforced nonwoven silt retention fabric, where the reinforcing material is embedded with the fibers and secured by mechanical entrapment, without substantially bonding or fusing the scrim reinforcing element to or with the nonwoven fibers. In another exemplary system according to this aspect, the system includes a scrim-reinforced nonwoven silt retention fabric, where the reinforcing material is embedded with the fibers and is secured further by adhesive and/or thermal bonding.

The stake can be wood, metal, plastic, or other suitable material, as needed or desired for a particular application. Likewise, any suitable fastener may be used, for example, a staple, pin, clip, hook, hook and loop, snap, band, screw, nail, or any other implement capable of penetrating the fabric and securing it to the stake.

Thus, in one particular example, the system may include at least one wood stake, at least one fastener, for example, a staple, and a needlepunched spunbond polyester nonwoven fabric having a fiberglass scrim 616 entrapped and entangled with the fibers 618 without additional adhesive or mechanical bonding.

Figure 9:
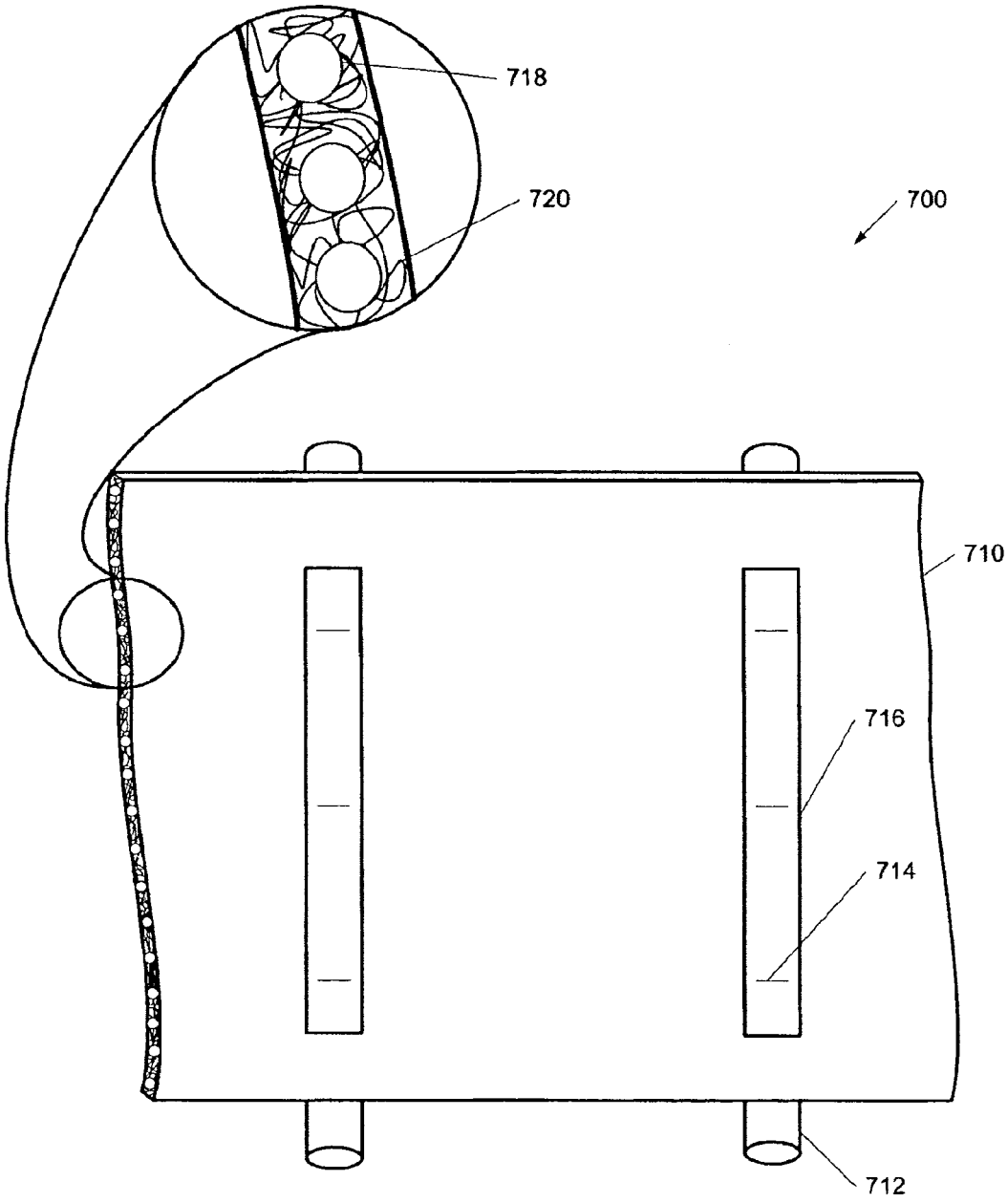
FIG. 9 is an exploded view of yet another exemplary silt retention material and system including such a material according to various aspects of the present invention.

In another variation of this aspect shown in FIG. 9, the system includes a silt retention sheet 710, at least one stake 712, at least one fastener 714, and at least one fastener support 716. To assemble the silt retention into a fence 700 according to this aspect, a stake 712 is inserted into the soil (not shown), the silt retention sheet 710 is aligned with the stake 712, the fastener support 716 is positioned over the sheet distal, but in at least partial alignment with, the stake 712, and the fastener 714 is inserted through the fastener support 716, through the sheet 710, and into the stake 712. This process is repeated until the desired silt retention fence or system is attained.

It will be understood that the various components may be assembled in various other orders, as desired. Also, it will be understood that the fastener may be inserted through the stake or through the fastener support, provided that the sheet is securely attached.

As with above, if desired, the silt retention system may be pre-assembled, such that the stakes are pre-attached to the silt retention fabric using the fasteners and fastener supports. In such an instance, the system may be rolled up, folded, wound onto a support roll, or the like, for easy transportation and assembly. The stakes then would be inserted into the soil as desired.

In use, the fastener support minimizes tearing of the fabric at or proximate the attachment points along the stake, thereby reducing the rate of failure of the silt retention fence. Furthermore, depending on the particular application, use of a fastener support also may improve sedimentation by providing a more stable fence that is capable of retaining more solids, even during heavy flow.

Numerous fastener supports are contemplated by the present invention. If desired, any of the various numerous strips, bands, belts, patches, and other reinforcing elements described herein or contemplated hereby also may be used as a fastener support. In one aspect, the fastener support is a strip, band, piece, disk, or any other shaped piece of wood, plastic, metal, composite material, or any other suitable material through which the desired fastener can penetrate.

The fastener support may be dimensioned to have any desired width, for example, from about 0.125 to about 0.75 inches. As another example, the width of the fastener support may be from about 0.25 to about 0.5 inches. If desired, the width of the fastener support may be selected to be approximately equal to that of the stake for easy alignment thereof. However, it will be understood that the width of the support may be greater or less than that of the stake.

The fastener support may have any thickness as needed or desired, provided that fastener is capable of sufficiently penetrating the support, the fabric, and the stake to provide a secure attachment of the fabric thereto. It will be understood that if a particular support is desired to be used, an alternate fastener may be selected to achieve a secure attachment of the fabric to the stake.

Likewise, the fastener support may have any length as desired. The support generally may have a length that is less than the length of the stake (or the height of the resulting fence). In one example, the fastener support has a length that is approximately equal to that of the intended exposed area of the stake (that which is not underground). In one aspect, the support has a length of from about 2 to about 24 inches, for example, about 18 inches. In another aspect, the support has a length of from about 32 to about 40 inches, for example, about 30 inches. In yet another aspect, the support has a length that is at least about 15 inches, for example, at least about 18 inches. Other examples of lengths that may be suitable include 2 inches, 5 inches, and 12 inches. However, numerous other lengths are contemplated hereby.

Any silt retention sheet may be used, including but not limited to, those described herein or contemplated hereby. In one exemplary system according to this aspect, the system includes a scrim-reinforced nonwoven silt retention sheet, where the reinforcing element is embedded with the fibers and secured by mechanical entrapment, without bonding or fusing the reinforcing element to or with the nonwoven fibers. In another exemplary system according to this aspect, the system includes a scrim-reinforced nonwoven silt retention sheet, where the reinforcing element is embedded with the fibers and is secured further by adhesive and/or thermal bonding.

As with the various other systems provided herein or contemplated hereby. The stake can be wood, metal, plastic, or other suitable material, as needed or desired for a particular application. Likewise, any suitable fastener may be used, for example, a staple, pin, clip, hook, hook and loop, snap, band, screw, nail, or any other implement capable of penetrating the fastener support and the fabric, and securing it to the stake.

Thus, by way of example and not by limitation, one example of a system according to this aspect may include a fabric comprising a wood stake, a wood lattice strip fastener support, a fastener, for example, a staple, and a needlepunched spunbond polyester nonwoven material having a fiberglass scrim 718 entrapped and entangled with the fibers 720 without any additional adhesive or mechanical bonding. Various aspects of the present invention may be understood further by way of the following examples, which are not to be construed as limiting in any manner.

EXAMPLES

The properties and performance of an exemplary silt retention system (S) according to the present invention were evaluated to determine its sediment restraining properties and flow through rates relative to a commercially available Type C silt fence (W) control. Dimensional analysis also was conducted to determine the maximum loads that would be expected with typical sediment barrier applications. The physical characteristics of the systems are provided in Table 3.

TABLE 3

| | Sample W | Sample S |
|---|---|---|
| General description | Woven polypropylene, style 2098, 28 EPI × 19 PPI | Fiberglass scrim (0.25 in. mesh) reinforced spunbond polyester (about 4-5 dpf) attached to stake using wood lattice fastener support strip |

TABLE 3-continued

| | Sample W | Sample S |
|---|---|---|
| Source | Willacoochee Industrial Fabrics (Willacoochee, GA) | Silt-Saver, Inc. (Conyers, GA) |
| Basis weight (osy) | 6.2 | 3.0 |
| Thickness (mm) | Not tested | 0.4 mm |
| Grab tensile (lb) (ASTM D-4632) | Warp (machine direction) - 300 Fill (cross direction) - 200 | Warp (machine direction) - 124 Fill (cross direction) - 88 |
| Grab elongation (%) (ASTM D-4632) | 30 | Warp (machine direction) - 81 Fill (cross direction) - 102 |
| AOS - Apparent opening size (max. sieve size) (ASTM D-4751) | # 40 (0.420 mm) | # 70 (0.210 mm) |
| Flow rate (gal/min/sq. ft.) (ASTM D-4491) | 50 (2035 L/min/m$^2$) | 95 |
| Permittivity (per sec) (ASTM D-4491) | Not tested | 1.27 |
| Permeability (cm/sec) (ASTM D-4491) | Not tested | 0.226 |
| Ultraviolet stability after 300 hours (ASTM D-4355) | 90% (after 500 hours) | Not tested |
| Burst strength, PSI (ASTM D-3786) | 450 | 206 |
| Minimum fabric width (in.) | unknown | 42 |
| Puncture (lb) | 120 | 24 dN |
| Trapezoid tear | 65 lb | Warp - 22 dN Fill - 20 dN |

Example 1

Testing was conducted according to ASTM D-5141-96 (2004) titled "Standard Test Method for Determining Filtering Efficiency and Flow Rate of a Geotextile for Silt Fence Application Using Site-Specific Soil". A watertight flume was constructed using aluminum and pressure treated plywood using specifications from FIG. 1 of ASTM D-5141. The flume was supported at an 8% grade. The test material was fastened securely along the entire length of 3 sides of the flume opening to ensure that the material had no wrinkles or loose sections across the entire cross section.

Three soil types were selected for use in preparing slurry mixtures. The soils were chosen to represent the variety of textural properties commonly found in Georgia and to test the materials effectiveness at containing sediment derived from various parent materials (Table 4). To represent the diversity found in many soils, for example, in Georgia, a Cecil (sandy clay loam to clay), Tifton (sand to sandy loam), and Fannin (loam to silt loam) series were prepared.

TABLE 4

| Soil Texture | % Sand | % Silt | % Clay |
|---|---|---|---|
| Sand | 88 | 8 | 4 |
| Silt loam | 22 | 64 | 8 |
| Clay loam | 30 | 40 | 30 |

Test soils were collected in the field from the upper 10 cm of the soil profile and air dried and sieved through a 2 mm sieve prior to testing. Three concentrations were used for the testing: 0 ppm (clear), the concentration set forth in the standard, 2890 ppm (standard), and double the standard concentration, 5780 ppm (double).

The three concentrations of sediment laden water were mixed in a 50 L holding container on top of the flume. Next, 150 and 300 g of dry test soil were added to 50 L of tap water within the top holding container to mix the standard and double concentrations, respectively. The temperature of the solution was recorded so that the viscosity of the water could be standardized. The solution was thoroughly mixed using a mechanical stirring device (paint stirrer on a 4 amp drill) for one minute to ensure a uniform mix. While continuously mixing the solution, a 150 ml depth integrated sample was taken to measure the initial turbidity of the sediment laden water. After one minute of mixing, the sediment solution was released from the container into the upper end of the flume. The timer was started upon release of the water. The holding container then was rinsed using 2 L of water allowing the rinse water to enter into the upper end of the flume.

The flow of water through the material was timed and recorded until no water remained behind the material or 25 minutes had elapsed. In the cases where 25 minutes elapsed and water remained behind the material, the distance from the material to the edge of the water up the flume was measured. The filtrate that passed through the flume was collected in a 100 L plastic container. The collected filtrate was then agitated with a stirrer for one minute. After one minute of stirring, a 500 ml depth integrated sample was taken to measure the suspended solids and turbidity of the leachate.

The ASTM standard provides equations for calculating suspended solids, filtering efficiency, and flow rate. The equations for suspended solids and filtering efficiency were given as:

$$S_s = \frac{(A - B) \times 1000}{C} \tag{1}$$

where:

$S_s$=Suspended solids, ppm;

A=weight of filter plus residue (g);

B=weight of filter (g); and

C=sample size, ml.

$$F_E = \frac{2890 - S_s}{2890} \times 100 \quad (2)$$

where:

$F_E$=Filtering efficiency; and 2890 represents the sediment placed behind the material, and is replaced with 5780 for the double concentration runs.

However, the equations for the flow rate that were given in the ASTM standard were determined to be incorrect. Through consultation with the standard developers, the following equations were derived to calculate flow rate ($F_T$) through the specimen in $m^3/m^2/min$:

For complete drainage in less than 25 minutes:

$$F_T = 0.606/t \quad (3)$$

or for incomplete drainage:

$$F_T = \frac{0.05 - 0.000000034X^2}{0.082 - 0.000068X} \Big/ t \quad (4)$$

where:

t=time for flow, min.; and

X=distance from the material to the edge of the water behind the geotextile, mm.

Since there was very little temperature variation in the room over the testing period (temperature ranged from 21.7±0.4° C.), a correction for the viscosity of water was made using the average temperature rather than the individual runs as outlined in equation 5 of the standard.

Figure 10:
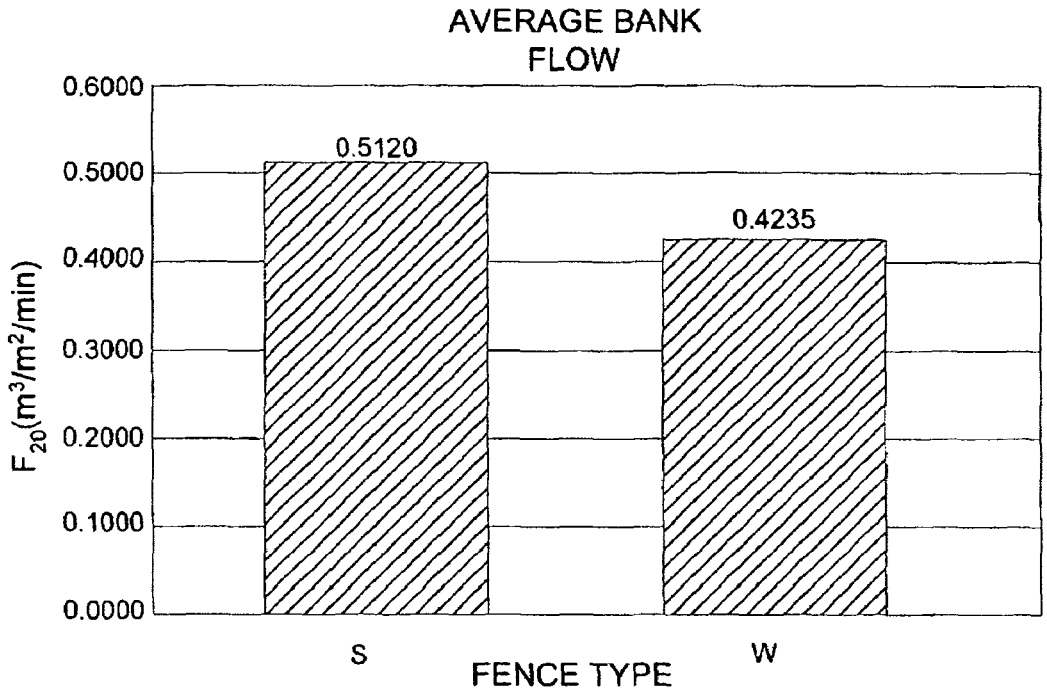
FIG. 10 presents comparative average blank flow data for an exemplary silt retention material according to various aspects of the present invention and a control material.
Figure 11:
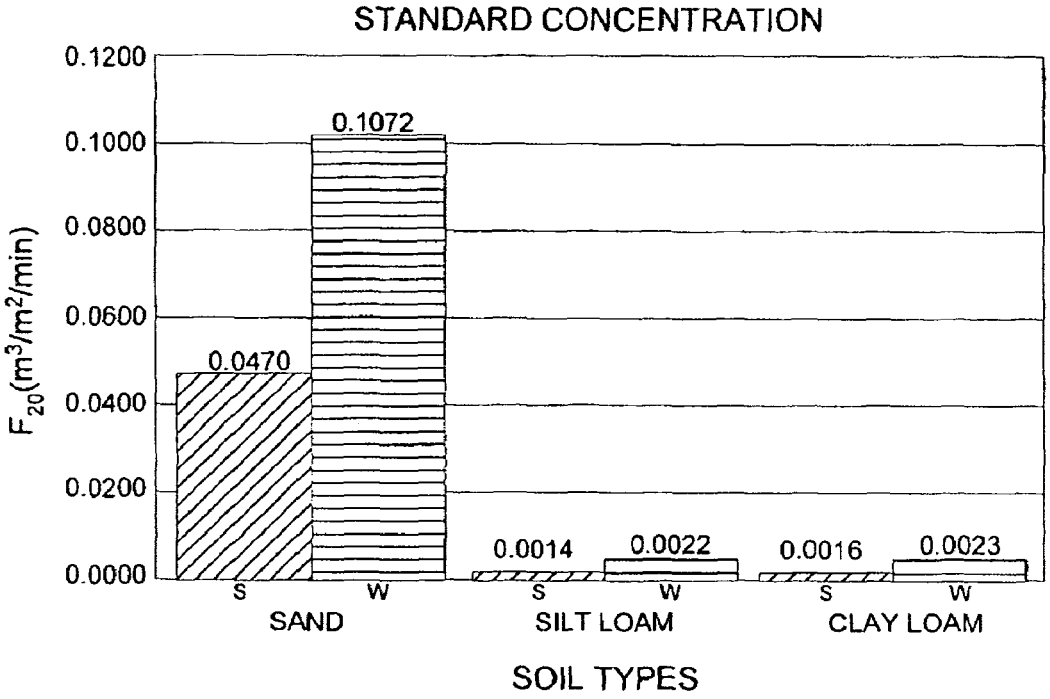
FIG. 11 presents comparative standard concentration flow data for an exemplary silt retention material according to various aspects of the present invention and a control material.
Figure 12:
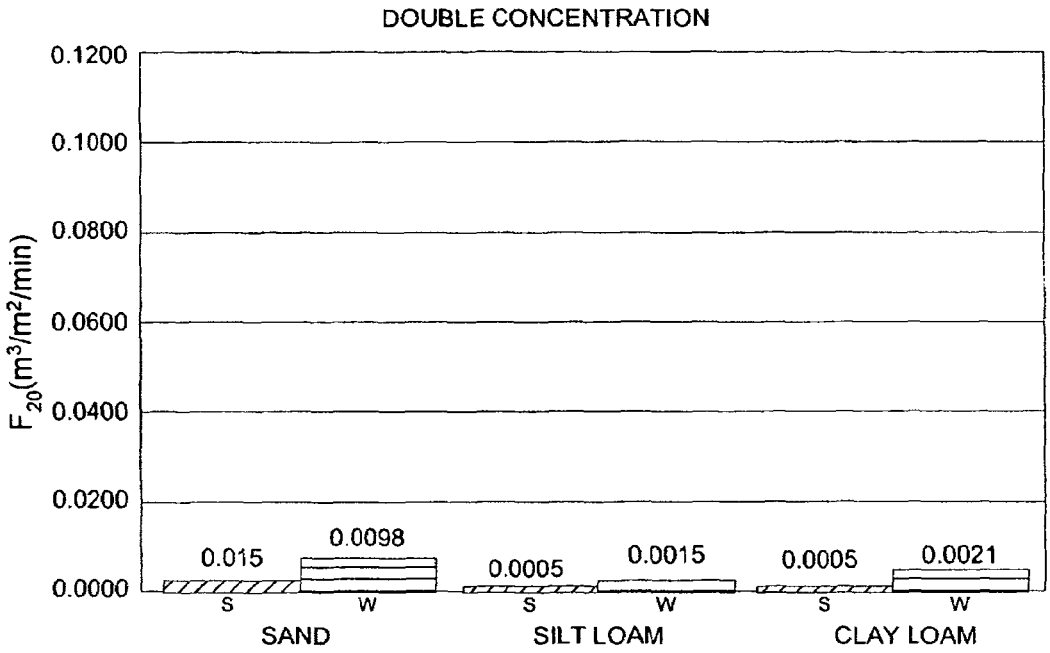
FIG. 12 presents comparative double concentration flow data for an exemplary silt retention material according to various aspects of the present invention and a control material.

Each test consisted of a clear, single, and double concentration run on a single section of material. The test was run in triplicate for each soil type on both materials for a total of 18 tests. After each test was completed, the test material was removed from the flume, dried, and saved. The top holding tank, the flume, gutter, and collector then were cleaned using tap water to remove any remaining sediment. A new section of material was then fastened securely along the entire length of 3 sides of the flume for the next test. The results are presented in Table 5 and FIGS. 10-12.

TABLE 5

| | | Flow Rate ($m^3/m^2/min$) | | |
|---|---|---|---|---|
| | Sample | Clear | Single | Double |
| Sand | S | 0.6753 | 0.0470 | 0.0015 |
| | W | 0.4560 | 0.1072 | 0.0098 |
| Silt | S | 0.4544 | 0.0014 | 0.0005 |
| | W | 0.4265 | 0.0022 | 0.0015 |
| Clay | S | 0.4163 | 0.0016 | 0.0005 |
| | W | 0.3881 | 0.0023 | 0.0021 |

Captured samples from each of the tests were analyzed for total suspended solids and turbidity. Total suspended solids were analyzed using the standard method set forth in Methods for the Examination of Waster and Wastewater (Greenberg at al., 1998). Whatman 934-AH glass micro fiber filters were used for the procedure. The sample volume was 100 ml.

Figure 13:
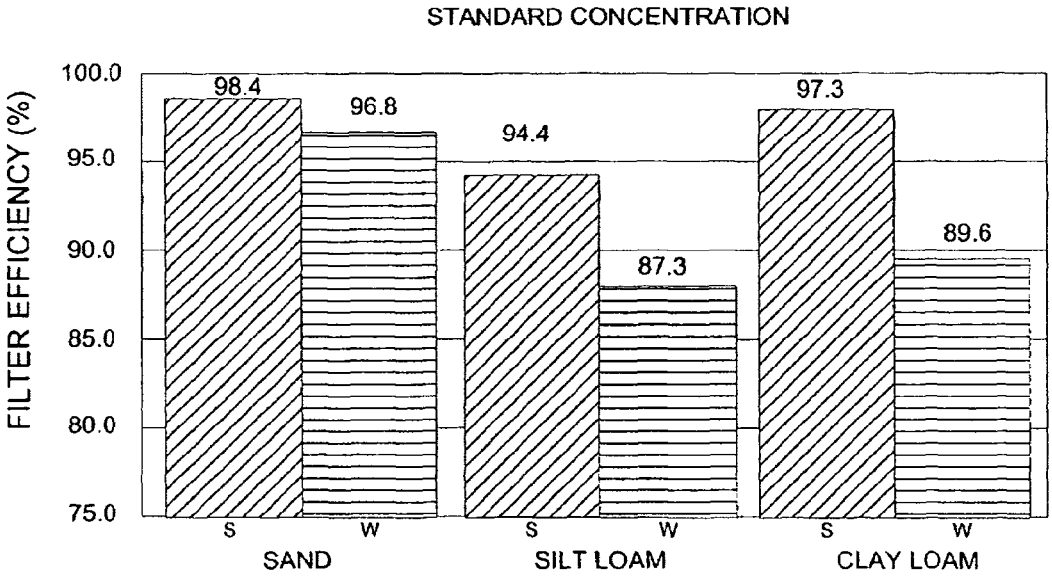
FIG. 13 presents comparative standard concentration filter efficiency data for an exemplary silt retention material according to various aspects of the present invention and a control material.
Figure 14:
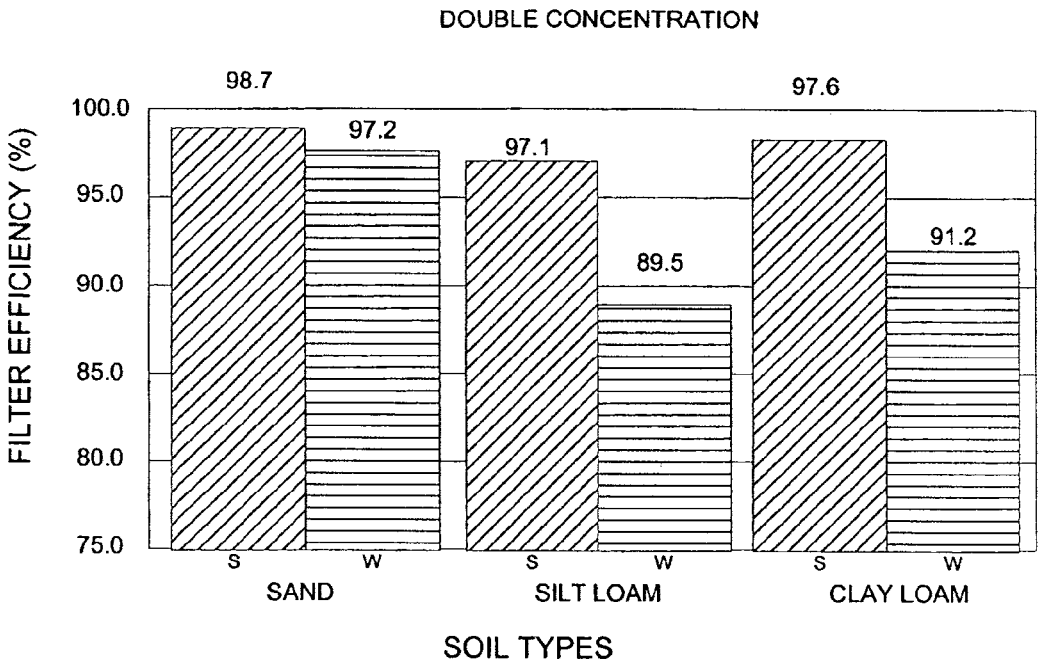
FIG. 14 presents comparative double concentration filter efficiency data for an exemplary silt retention material according to various aspects of the present invention and a control material.
Figure 15:
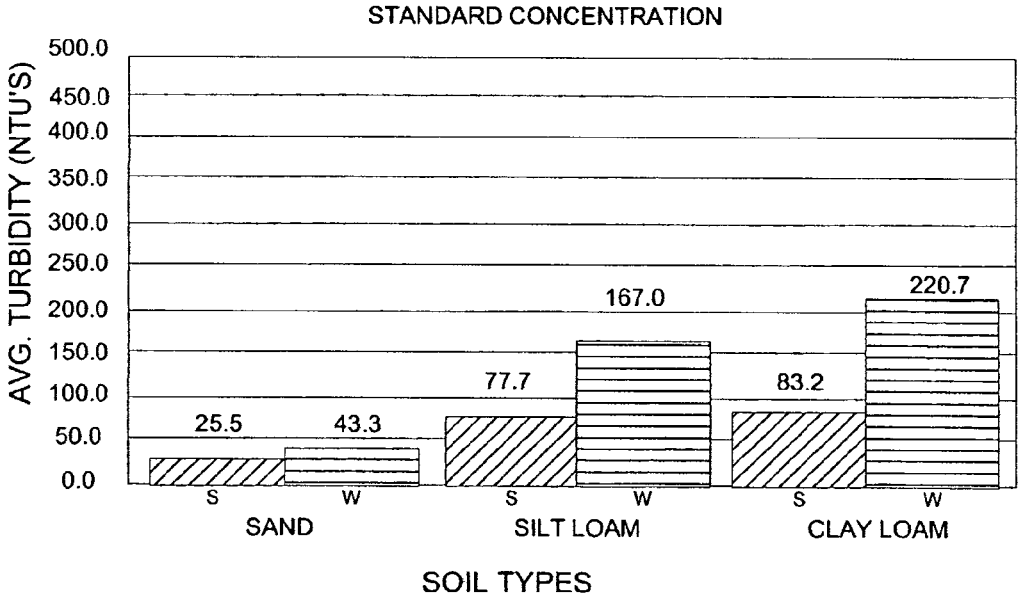
FIG. 15 presents comparative standard concentration turbidity data for an exemplary silt retention material according to various aspects of the present invention and a control material.
Figure 16:
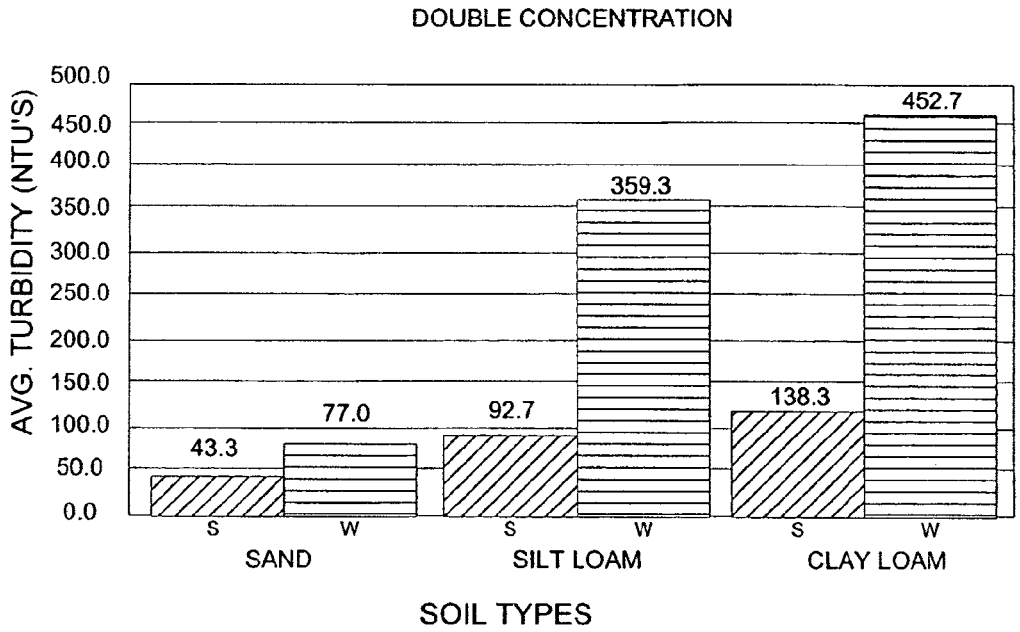
FIG. 16 presents comparative double concentration turbidity data for an exemplary silt retention material according to various aspects of the present invention and a control material.

Turbidity was run on a HF scientific DRT 100B. The instrument was zeroed using deionized (DI) water. Samples bottles were shaken vigorously for 10 seconds. A small subsample was poured into the instrument cuvette and capped. The subsample was again shaken vigorously for 10 seconds and placed in the instrument. A 10 second average was taken for the reading. The subsample was then discarded and the cuvette was rinsed thoroughly with DI water. This process was repeated for each sample. SAS analysis of variance (ANOVA) was used for statistical analysis to determine differences between the treatments. The results are presented in Table 6, in FIGS. 13 and 14 (filtration efficiency), and in FIGS. 15 and 16 (turbidity).

TABLE 6

| | Type | Suspended solids (ppm) | Turbidity (NTU) | $F_E$ (%) | % Reduction in turbidity |
|---|---|---|---|---|---|
| | | Standard concentration | | | |
| Sand | S | 46.0 | 25.5 | 98 | 58 |
| | W | 92.3 | 43.3 | 97 | 25 |
| Silt | S | 161.3 | 77.7 | 94 | 81 |
| | W | 365.7 | 167.0 | 87 | 58 |
| Clay | S | 76.7 | 83.2 | 97 | 82 |
| | W | 300.7 | 220.7 | 90 | 51 |
| | | Double Concentration | | | |
| Sand | S | 73.3 | 43.3 | 99 | 55 |
| | W | 163.0 | 77.0 | 97 | 31 |
| Silt | S | 166.7 | 92.7 | 97 | 90 |
| | W | 608.7 | 359.3 | 90 | 58 |
| Clay | S | 139.3 | 138.3 | 98 | 84 |
| | W | 509.3 | 452.7 | 91 | 45 |

Example 2

The flume was raised to about 58% to produce more hydraulic head and simulate a 60% slope (referred to herein as "modified ASTM D-5141-96(2004))". Testing at the higher slope was only conducted for the silt loam soil. Each test included a clear, single, and double concentration run per material. The test was run in triplicate for each fence for a total six tests.

The same apparatus was used for the 60% slope as for the 8% slope (Example 1), except as follows: the brace that secured the holding tank was modified to level the tank; the gutter that channeled the leachate into the 100 L plastic container was removed and replaced with flashing, which allowed the leachate to freefall into a new plastic container that was wider than the flume; and the new receptacle was calibrated so the volume of leachate collected could be calculated by the depth of leachate in the container.

The same timing and sampling procedure was used for the 60% slope as for the 8% slope (Example 1), except that the total volume of slurry passing the fence was measured and recorded instead of measuring the distance of pooled water behind the fence after 25 minutes. The following equations were derived and used to calculate the flow rate:

for complete drainage in less than 25 minutes:

$$F_T = 0.2252/t \quad (5); \text{ or}$$

for incomplete drainage:

$$F_T = \frac{Vnet}{0.222} \Big/ t \quad (6)$$

where:

t=time for flow in minutes,

Vnet=total flow that passed through the fence barrier in cubic meters, and 0.222=the area of fence material exposed to flow.

Figure 17:
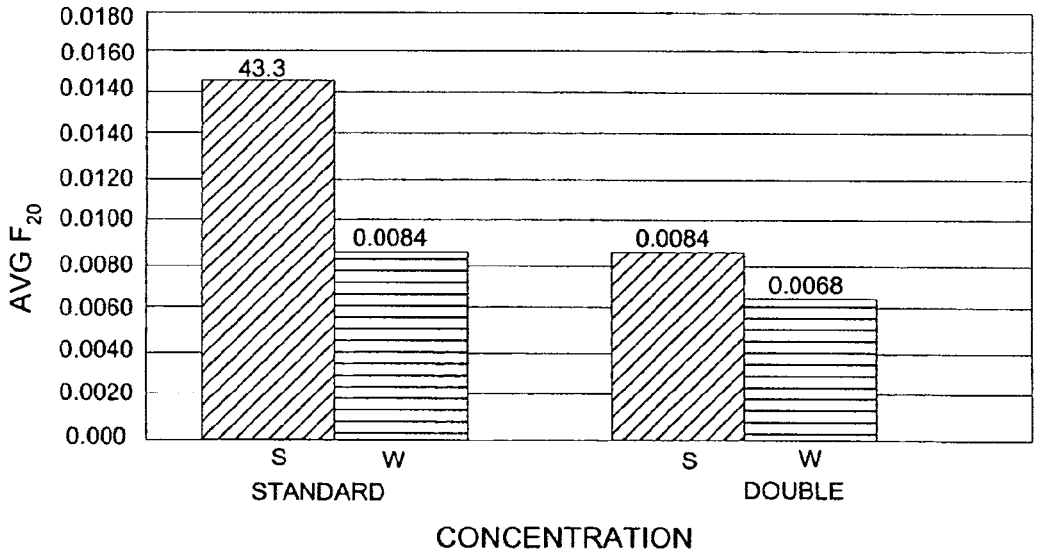
FIG. 17 presents comparative flow data for an exemplary silt retention material according to various aspects of the present invention and a control material using a modified test method.
Figure 18:
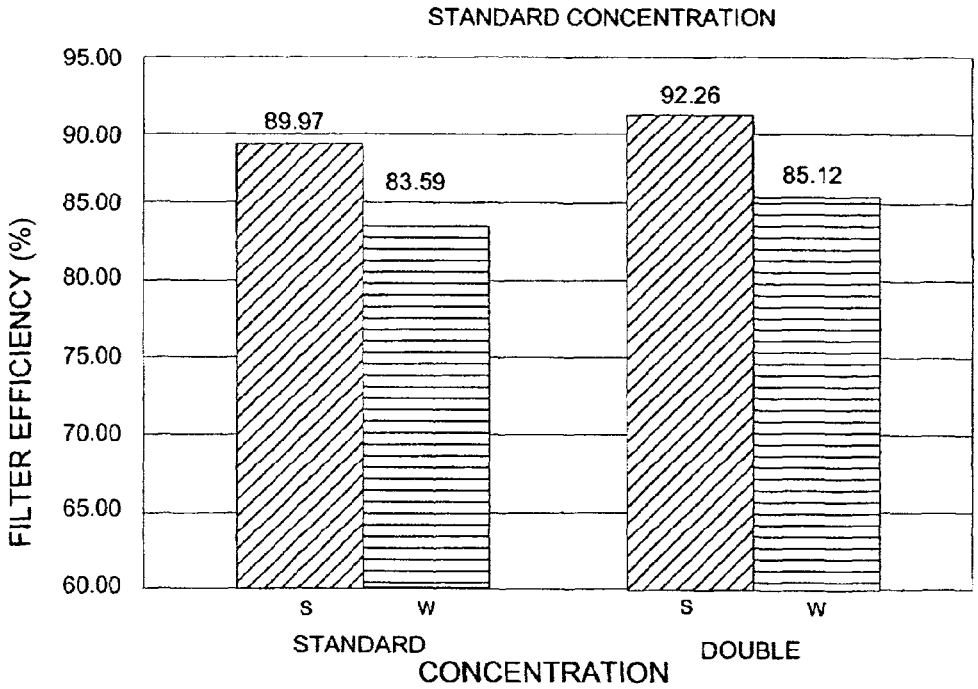
FIG. 18 presents comparative filter efficiency data for an exemplary silt retention material according to various aspects of the present invention and a control material using a modified test method.
Figure 19:
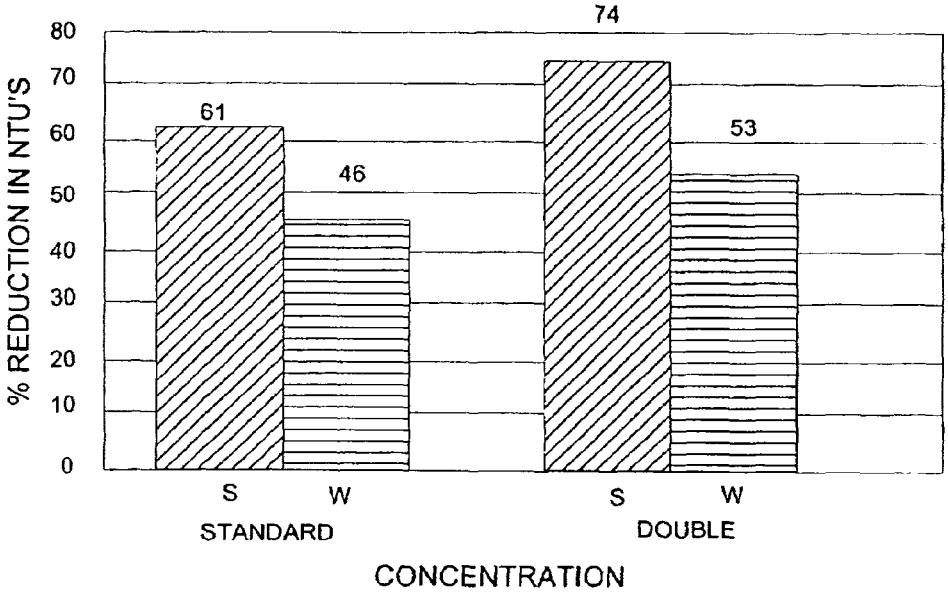
FIG. 19 presents comparative turbidity reduction data for an exemplary silt retention material according to various aspects of the present invention and a control material using a modified test method.

The results are presented in Table 7 and FIGS. 17-19.

TABLE 7

| Fence type | Run | Flow Rate ($m^3/m^2/min$) | Suspended solids (ppm) | Turbidity (NTU) | $F_e$ (%) | % Reduction in turbidity |
|---|---|---|---|---|---|---|
| S | Clear | 0.4054 | | | | |
| | Standard | 0.0149 | 290 | 130 | 90 | 61 |
| | Double | 0.0084 | 447 | 197 | 92 | 74 |
| W | Clear | 0.3747 | | | | |
| | Standard | 0.0084 | 474 | 171 | 84 | 46 |
| | Double | 0.0068 | 860 | 322 | 85 | 53 |

Example 3

Figure 20:
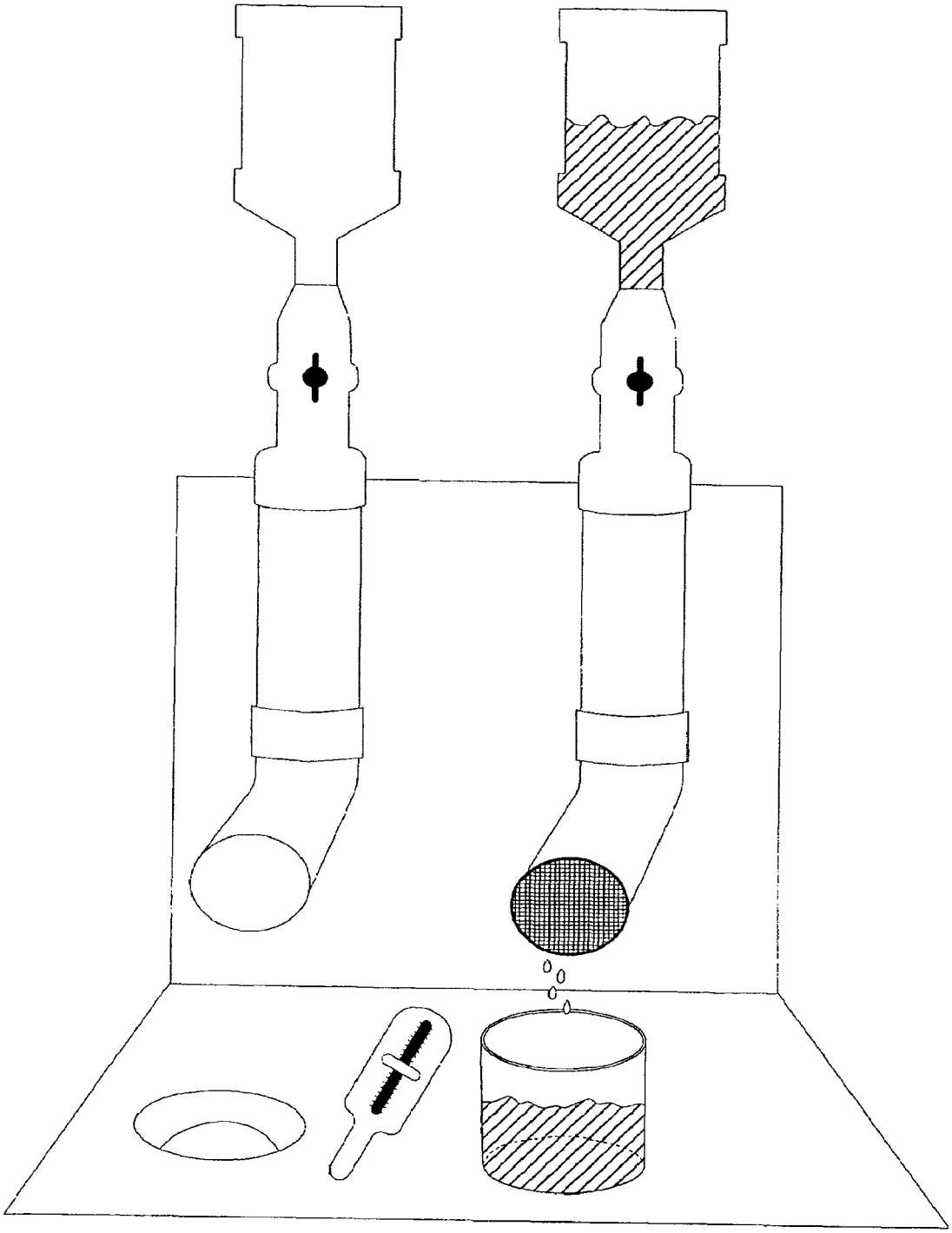
FIG. 20 depicts an exemplary test apparatus according to various aspects of the present invention.

In addition to flume testing, an additional structure and test method were constructed to determine if simplified method would produce similar results. Using the apparatus shown in FIG. 20, additional evaluations were conducted using the silt loam soil. These runs were only conducted at the standard concentration.

PVC piping was used to construct an apparatus consisting of a 7 L holding tank placed on top of a valve. Attached below the valve was a 14 in. section of 4 in. PVC pipe which ran perpendicular to the ground. A 45° elbow with a 4 in. diameter was attached to the bottom of the pipe. A 7 inch diameter section of geotextile was tightly fastened to the open end of the elbow with a ring clamp. A plastic container was placed below the opening to collect the leachate.

For this test, 21 g of soil was added to 7 L of tap water in order to make the standard concentration, 2890 ppm. The temperature of the water was recorded and the soil laden water was mixed with a small paint stirrer for 1 minute. While still mixing, a depth integrated sample was taken to measure the initial turbidity of the water. At this point the valve was opened and the timer started. An additional 100 ml of water was used to rinse any remaining sediment from the holding container.

The flow of slurry was timed until the leachate began to drip into the plastic container or 25 minutes had elapsed. If 25 minutes elapsed the total volume of leachate collected was measured and recorded. The leachate was then agitated for 1 minute with a small paint stirrer and a depth integrated 500 ml sample was taken to measure the suspended solids and turbidity of the leachate. Clear and standard concentrations were run for each geotextile material using the silt loam soil. The fence was replaced after each test. Each test was done in triplicate for each geotextile.

Flow rates were calculated by dividing the volume of flow collected ($m^3$) by the area ($m^2$) and the time required to collect the flow (maximum of 25 minutes). The results are presented in Table 8.

TABLE 8

| Fence type | Run | Flow rate ($m^3/m^2/min$) | Suspended solids (ppm) | Turbidity (NTU) | $F_e$ (%) | Reduction in turbidity (%) |
|---|---|---|---|---|---|---|
| S | Clear | 2.5493 | | | | |
| | Standard | 0.0314 | 148 | 61 | 95 | 82 |
| W | Clear | 2.7337 | | | | |
| | Standard | 0.0266 | 350 | 130 | 88 | 60 |

Comparison of Test Methods

A general comparison of the results obtained using each of the various test methods is provided in Tables 9 and 10. Table 9 provides a comparison of average flow rates ($m^3/m^2/min$) for each method using the silt loam soil. Table 10 provides a comparison of average filtering efficiency and percent reduction in turbidity for each method using the silt loam soil at the standard sediment concentration. Each value represents the average of the three replicates.

TABLE 9

| Fence | Run | Flume at 8% | Flume at 58% | Proposed Test |
|---|---|---|---|---|
| S | Clear | 0.4544 | 0.4054 | 2.5493 |
| | Standard | 0.0014 | 0.0149 | 0.0314 |
| W | Clear | 0.4265 | 0.3747 | 2.7337 |
| | Standard | 0.0022 | 0.0084 | 0.0266 |

TABLE 10

| | Filtering Efficiency | | | % Reduction in Turbidity | | |
|---|---|---|---|---|---|---|
| Fence | Flume at 8% | Flume at 58% | New test | Flume at 8% | Flume at 58% | New test |
| S | 94.4 | 90.0 | 94.9 | 81 | 61 | 82 |
| W | 87.3 | 83.6 | 87.9 | 58 | 46 | 60 |

The filter efficiencies and turbidity reductions for both the S and W systems were nearly the same as those measured using the ASTM test method. Since this testing apparatus is much easier to construct and the tests are easier to conduct, this procedure may offer advantages over the standard test method.

Although certain embodiments of this invention have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are used only for identification purposes to aid the reader's understanding of the various embodiments of the present invention, and do not create limitations, particularly as to the position, orientation, or use of the invention unless specifically set forth in the claims. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other.

While the present invention is described herein in detail in relation to specific aspects, it is to be understood that this detailed description is only illustrative and exemplary of the present invention and is made merely for purposes of providing a full and enabling disclosure of the present invention. It will be recognized by those skilled in the art, that various elements discussed with reference to the various embodiments may be interchanged to create entirely new embodiments coming within the scope of the present invention. It is intended that all matter contained in the above description or shown in the accompanying drawings shall be interpreted as illustrative only and not limiting. Changes in detail or structure may be made without departing from the spirit of the invention as defined in the appended claims. The detailed description set forth herein is not intended nor is to be construed to limit the present invention or otherwise to exclude any such other embodiments, adaptations, variations, modifications, and equivalent arrangements of the present invention.

Accordingly, it will be readily understood by those persons skilled in the art that, in view of the above detailed description of the invention, the present invention is susceptible of broad utility and application. Many adaptations of the present invention other than those herein described, as well as many variations, modifications, and equivalent arrangements will be apparent from or reasonably suggested by the present invention and the above detailed description thereof, without departing from the substance or scope of the present invention.

What is claimed is:

1. A reinforced silt retention sheet arranged above ground, for use in a silt management application, comprising:

a flexible, water permeable, [nonwoven] fabric comprising a plurality of entangled polymer fibers *and having a thickness of about 0.1 mm to about 5mm*; and a reinforcing material or element extending along the [non-woven] fabric and adapted to support and prevent ripping or tearing of the silt retention sheet secured [within] *with* the entangled polymer fibers without substantially being bonded thereto, the reinforcing material or element being arranged spaced in non-overlapping intervals in the warp and/or fill direction of the [nonwoven] fabric, wherein the silt retention sheet has a maximum apparent opening size of less than about 0.6 millimeters as measured by ASTM D-4751.

2. The silt retention sheet of claim 1, wherein the [non-woven] fabric comprises a spunbond polyester having a basis weight of from about 1 to about 8 ounces per square yard.

3. The silt retention sheet of claim 1, wherein the [non-woven] fabric comprises a spunbond polypropylene fabric, a spunbond polyester fabric, spunbond polyethylene terephthalate fabric, a needle punched polyester fabric, a needlepunched polyethylene terephthalate fabric, a needlepunched spunbond polyethylene terephthalate fabric, or any combination thereof.

4. The silt retention sheet of claim 1, wherein the reinforcing material comprises a fiberglass scrim having a mesh size of from about 0.1 inches to about 0.5 inches.

5. The silt retention sheet of claim 1, having a tensile strength of at least about 75 lbs, as measured according to ASTM D-4632.

6. The silt retention sheet of claim 1, having a standard concentration reduction in turbidity of at least about 58% as measured according to ASTM D-5141-96(2004).

7. The silt retention sheet of claim 1, having a double concentration reduction in turbidity of at least about 55% as measured according to ASTM D-5141-96(2004).

8. The silt retention sheet of claim 1, having a standard concentration filtering efficiency of at least about 90% as measured according to modified ASTM D-5141-96(2004).

9. The silt retention sheet of claim 1, having a double concentration filtering efficiency of at least about 92% as measured according to modified ASTM D-5141-96(2004).

10. The silt retention sheet of claim 1, formed by the process comprising:

(a) forming a layer of the entangled polymeric fibers;

(b) overlying the entangled polymeric fibers with the reinforcing material; and (c) overlying the reinforcing material with additional entangled polymeric fibers.

11. The silt retention sheet of claim 10, formed by the process further comprising:

(d) heating the sheet to form bonds between the entangled polymeric fibers without substantially bonding the entangled polymeric fibers to the reinforcing material.

12. The silt retention sheet of claim 10, formed by the process further comprising:

(d) selecting the polymeric fibers to have a lower softening point than a softening point of the reinforcing material; and (e) heating the sheet to a temperature above the softening point of the entangled polymeric fibers but below the softening point of the reinforcing material.

13. The silt retention sheet of claim 1, wherein the reinforcing material comprises a plurality of strands formed from at least one of polypropylene, polyester, nylon 6, 6, yarn, cord material, fiberglass, aramid fibers, and combinations thereof.

14. The silt retention sheet of claim 1 and wherein the reinforcing material *or element* comprises a series of strands aligned in proximity so as to form reinforcing elements at spaced locations along the [non-woven] fabric.

15. The silt retention sheet of claim 1 and further comprising ground supports attached to the reinforcing material *or element*.

16. The reinforced silt retention sheet as claimed in claim 15, further comprising an attachment means for attaching the ground supports to the reinforcing material wherein the reinforcing material further functions as an attachment point for the ground supports.

17. The silt retention sheet as claimed in claim 16, wherein the attachment means are selected from the group consisting of staples, pins, nails, rings, clips, adhesives, hook and loop fasteners, and combinations thereof.

18. The silt retention sheet of claim 1 and wherein the reinforcing material comprises a polymer material entangled within the polymer fibers of the [non-woven] fabric.

19. The silt retention sheet as claimed in claim 1, wherein the reinforcing element is comprised of a plurality of reinforcing strands or strips that form a band.

20. A reinforced silt retention sheet comprising a flexible, water permeable [non-woven] fabric sheet material *having a thickness of about 0.1 mm to about 5 mm and* including a plurality of [non-woven] polymer fibers and reinforcing elements formed from a resilient, tear resistant material and interspersed along said fabric sheet material to provide said fabric sheet material with enhanced strength and resistance to tearing, wherein the reinforced silt retention sheet has an apparent sieve opening size of less than approximately 0.6 mm as measured according to ASTM D-4751 to provide filtering efficiency for sediment control applications, and has an ultimate tensile strength ranging from about 100 lbs to 350 lbs in the warp direction and an ultimate tensile strength ranging from about 75 lbs to 450 lbs in the fill direction.

21. The reinforced silt retention sheet of claim 20, and wherein said fabric sheet comprises a spin bond material having a denier of approximately 1 dpf to approximately 10 dpf.

22. The reinforced silt retention sheet of claim 20, wherein the silt retention sheet is a silt retention fence.

23. A reinforced silt retention sheet arranged above ground, for use in a silt management application, comprising:

a flexible, water permeable, [nonwoven] *geotextile* fabric *filter material having a thickness of less than about 5 mm and* comprising a plurality of entangled polymer fibers; and a reinforcing material secured [within] *to* the entangled polymer fibers without being bonded thereto, the reinforcing material being spaced in discontinuous and non-overlapping intervals in the warp [and] *and/or* fill [direction] *directions*, wherein the silt retention sheet has a maximum apparent opening size of less than about 0.6 millimeters as measured by ASTM D-4751.

24. The reinforced silt retention sheet as claimed in claim 23, wherein the reinforced silt retention sheet has an ultimate tensile strength ranging from about 100 lbs to 350 lbs in the warp direction and an ultimate tensile strength ranging from about 75 lbs to 450 lbs in the fill direction.

*25. The silt retention sheet of claim 1, wherein the fabric comprises a non-woven fabric.*

*26. The silt retention sheet of claim 1, wherein the reinforcing elements comprise an array.*

*27. The reinforced silt retention sheet as claimed in claim 23, wherein the reinforcing material is secured within the entangled polymer fibers.*

*28. A reinforced silt retention sheet comprising a flexible, water permeable fabric sheet material having a thickness of about 0.1 mm to about 5 mm and including a plurality of reinforcing elements, said reinforcing elements formed from a resilient, tear resistant material and interspersed along said fabric sheet material to provide said fabric sheet material with enhanced strength and resistance to tearing, wherein said reinforced silt retention sheet has an apparent sieve opening size of less than approximately 0.6 mm as measured according to ASTM D-4751 to provide filtering efficiency for sediment control applications, and has an ultimate tensile strength ranging from about 100 lbs to 350 lbs in the warp direction and an ultimate tensile strength ranging from about 75 lbs to 450 lbs in the fill direction.*

*29. The reinforced silt retention sheet as claimed in claim 28, wherein said reinforcing elements are attached to said polymer fibers by an attachment means selected from the group consisting of stitching, adhesion, felting, heat fusion, and weaving.*

*30. The reinforced silt retention sheet as claimed in claim 29, wherein said reinforcing elements are interspersed along said fabric sheet such that said reinforcing elements form an array.*

*31. A reinforced silt retention sheet comprising:*

*a flexible, water permeable fabric sheet material comprising a plurality of polymer fibers; and*

*a plurality of reinforcing elements that provide reinforcing points at which at least one fastener can be attached, said reinforcing elements formed from a resilient, tear resistant material and attached to said fabric sheet material to provide a reinforced fabric sheet material with enhanced strength and resistance to tearing,*

*wherein said fabric sheet material comprises a geotextile fabric filter material having an apparent sieve opening size of less than approximately 0.6 mm as measured according to ASTM D-4751 to provide filtering efficiency for sediment control applications, and*

*wherein said reinforced silt retention sheet has:*

*an ultimate tensile strength ranging from about 100 lbs to 350 lbs in a warp direction,*

*an ultimate tensile strength ranging from about 75 lbs to 450 lbs in a fill direction,*

*a mullen burst strength ranging from about 150 to 450 pounds per square inch,*

*a flow rate ranging from about 35 to 160 gallons/minute/square foot, and*

*wherein said reinforcing elements are applied as strands, cords, arrays, strips, patches, or lengths of material attached along the web of said flexible, water permeable fabric sheet material.*

*32. The reinforced silt retention sheet of claim 31 and further comprising ground supports attached to the reinforcing material.*

*33. The reinforced silt retention sheet as claimed in claim 32, further comprising an attachment means for attaching the ground supports to the reinforcing material wherein the reinforcing material further functions as an attachment point for the ground supports.*

*34. The reinforced silt retention sheet as claimed in claim 33, wherein the attachment means are selected from the group consisting of staples, pins, nails, rings, clips, adhesives, hook and loop fasteners, and combinations thereof.*

* * * * *